US 6,729,070 B1

(12) United States Patent
Locke et al.

(10) Patent No.: US 6,729,070 B1
(45) Date of Patent: *May 4, 2004

(54) COMBINATION OF CONTAINER FOR GROWING PLANTS AND AERATING ROOT PRUNER

(76) Inventors: Randal D. A. Locke, P.O. Box 1325, 199 Humboldt Ave., Redway, CA (US) 95560-1325; Daniel Paul Dunbar, P.O. Box 1325, Redway, CA (US) 95560; Teresa Marie Locke, P.O. Box 1325, 199 Humboldt Ave., Redway, CA (US) 95560

( * ) Notice: Subject to any disclaimer, the term of this patent is extended or adjusted under 35 U.S.C. 154(b) by 0 days.

This patent is subject to a terminal disclaimer.

(21) Appl. No.: 09/347,506

(22) Filed: Jul. 2, 1999

Related U.S. Application Data

(63) Continuation-in-part of application No. 08/488,289, filed on Jun. 7, 1995, now Pat. No. 5,918,415.

(51) Int. Cl.⁷ .............................................. A01G 25/00

(52) U.S. Cl. ......................................................... 47/79

(58) Field of Search ............................ 47/79, 29, 65.5; 119/74, 78, 51.5, 61

(56) References Cited

U.S. PATENT DOCUMENTS

| 4,510,712 | A | * | 4/1985 | Whitcomb | 47/65.5 |
| 5,678,600 | A | * | 10/1997 | Locke et al. | 137/414 |
| 5,782,035 | A | * | 7/1998 | Locke et al. | 47/79 |
| 5,918,415 | A | * | 7/1999 | Locke et al. | 47/79 |

* cited by examiner

Primary Examiner—Charles T. Jordan
Assistant Examiner—Francis T. Palo

(57) ABSTRACT

Disclosed is a novel combination of a conventional plant pot with one or more drain holes in its bottom or its side wall near its bottom and a perforated conduit or tube which is removably affixed to the side wall of the container and which extends from at or near the top of the basin to its bottom and which acts as an aerating root pruner which provides air and water communication between top of the basin and a drain hole and the planting soil between them. Also disclosed is a automatic watering device which includes a basin for holding a volume of water to be dispensed to a water using attachment for a volume of water, a water dispensing diaphragm fill valve attached to a source of water which regulates the volume of water maintained in the basin, which basin has a mounting rim near its open top for mounting a water using attachment on it and a seat for mounting the fill valve in the basin below a predetermined water line determined by the fill valve; and the fill valve has a port for dispensing water from it into the basin until the water reaches the water line.

9 Claims, 17 Drawing Sheets

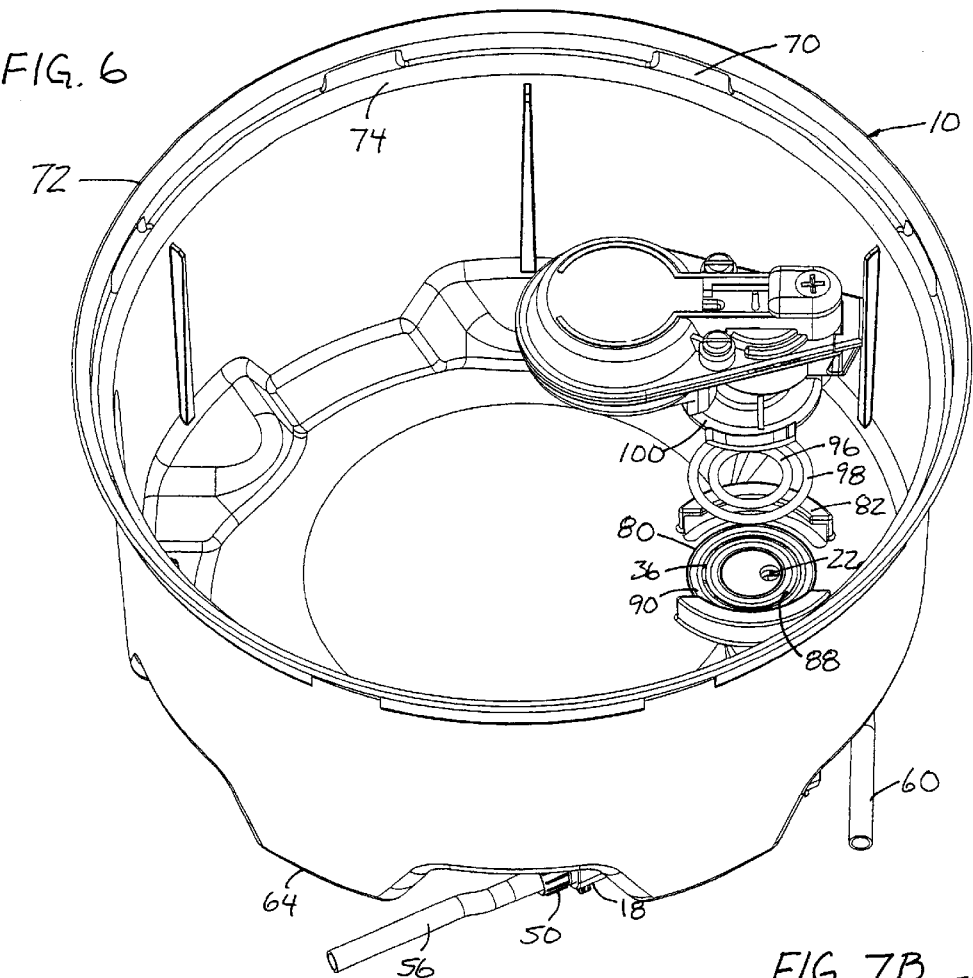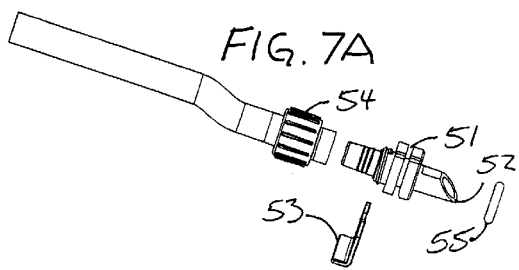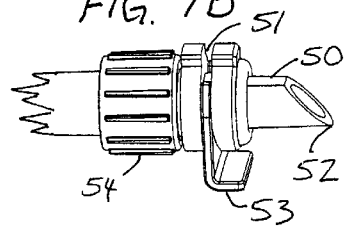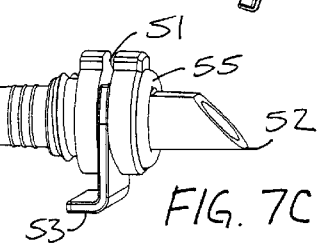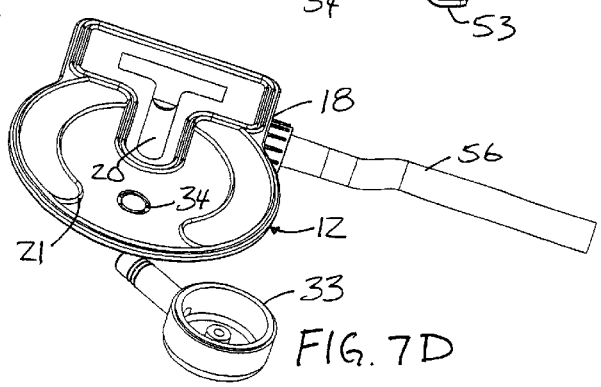

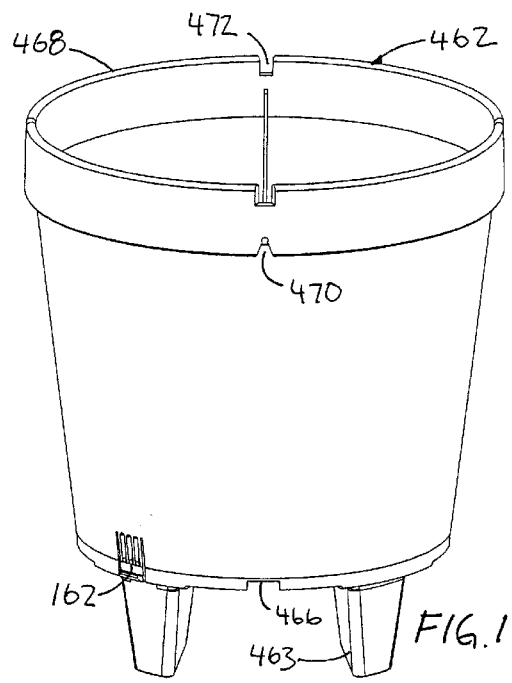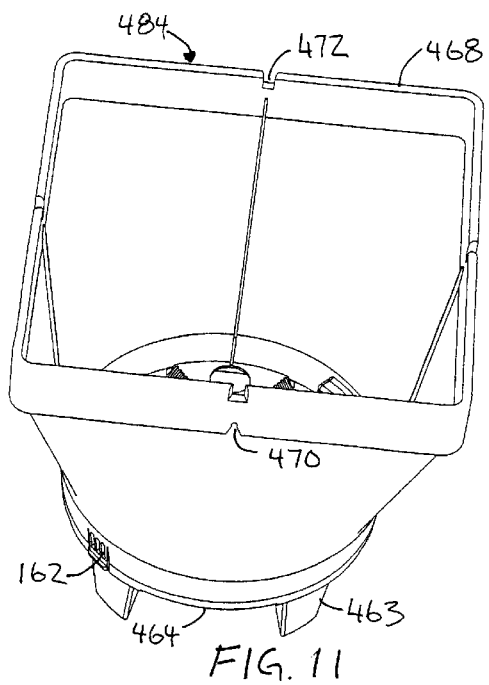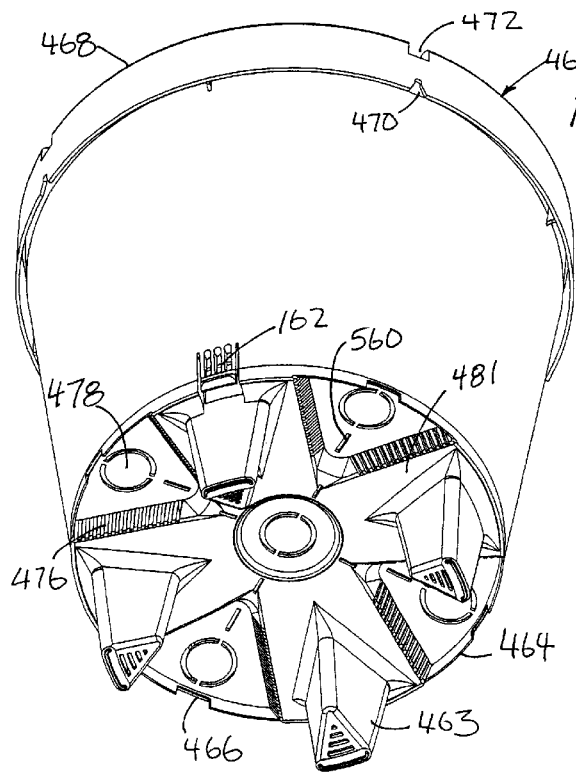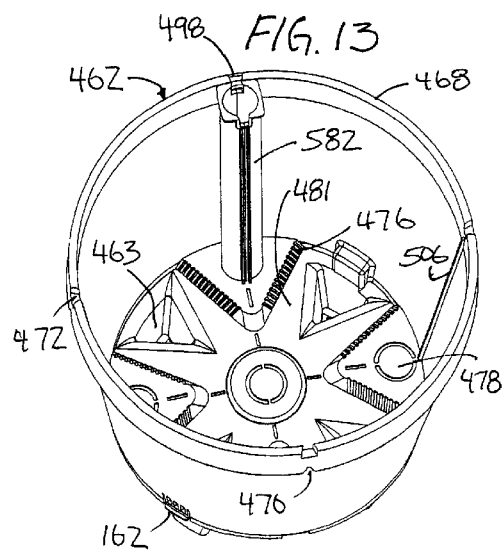

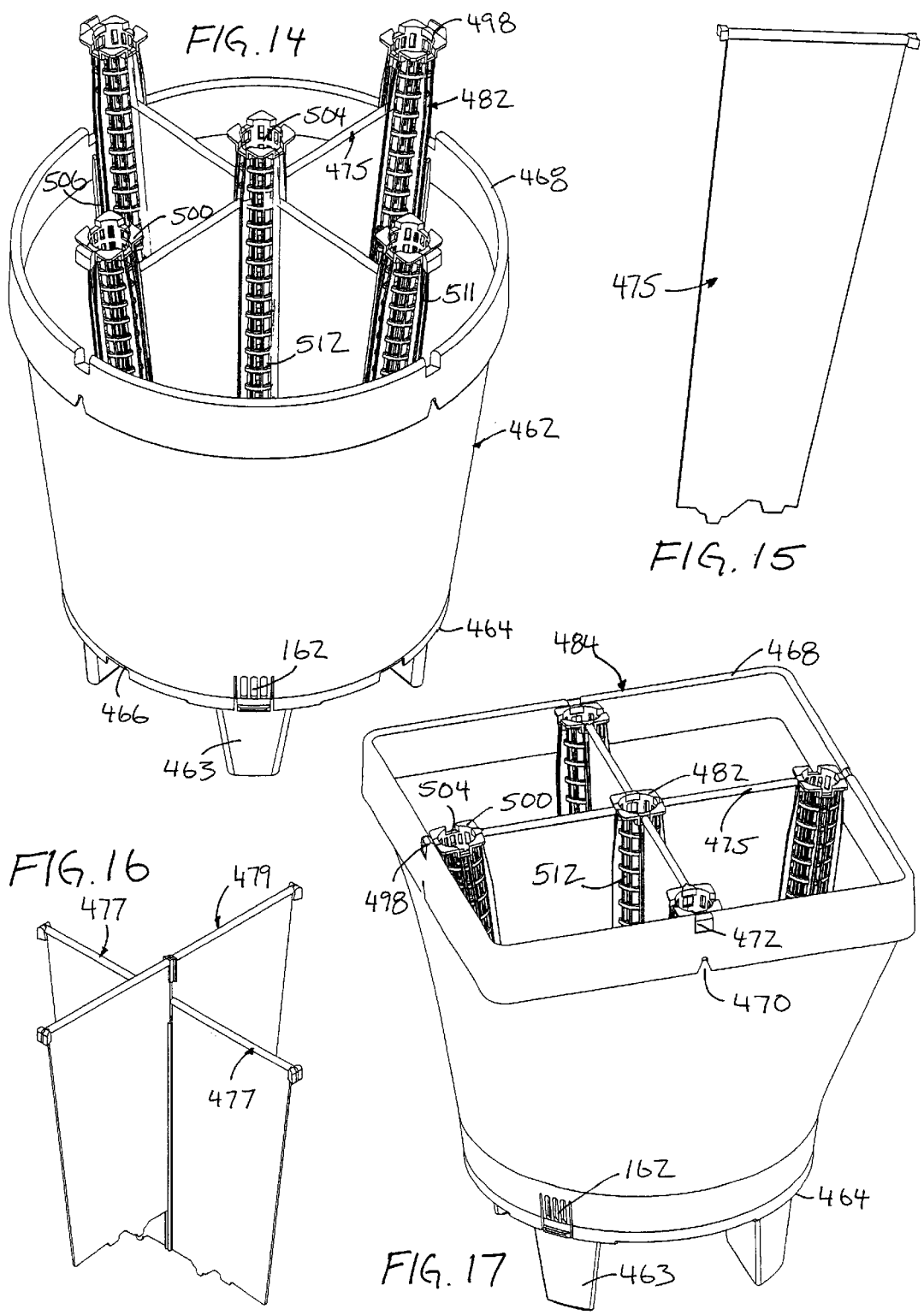

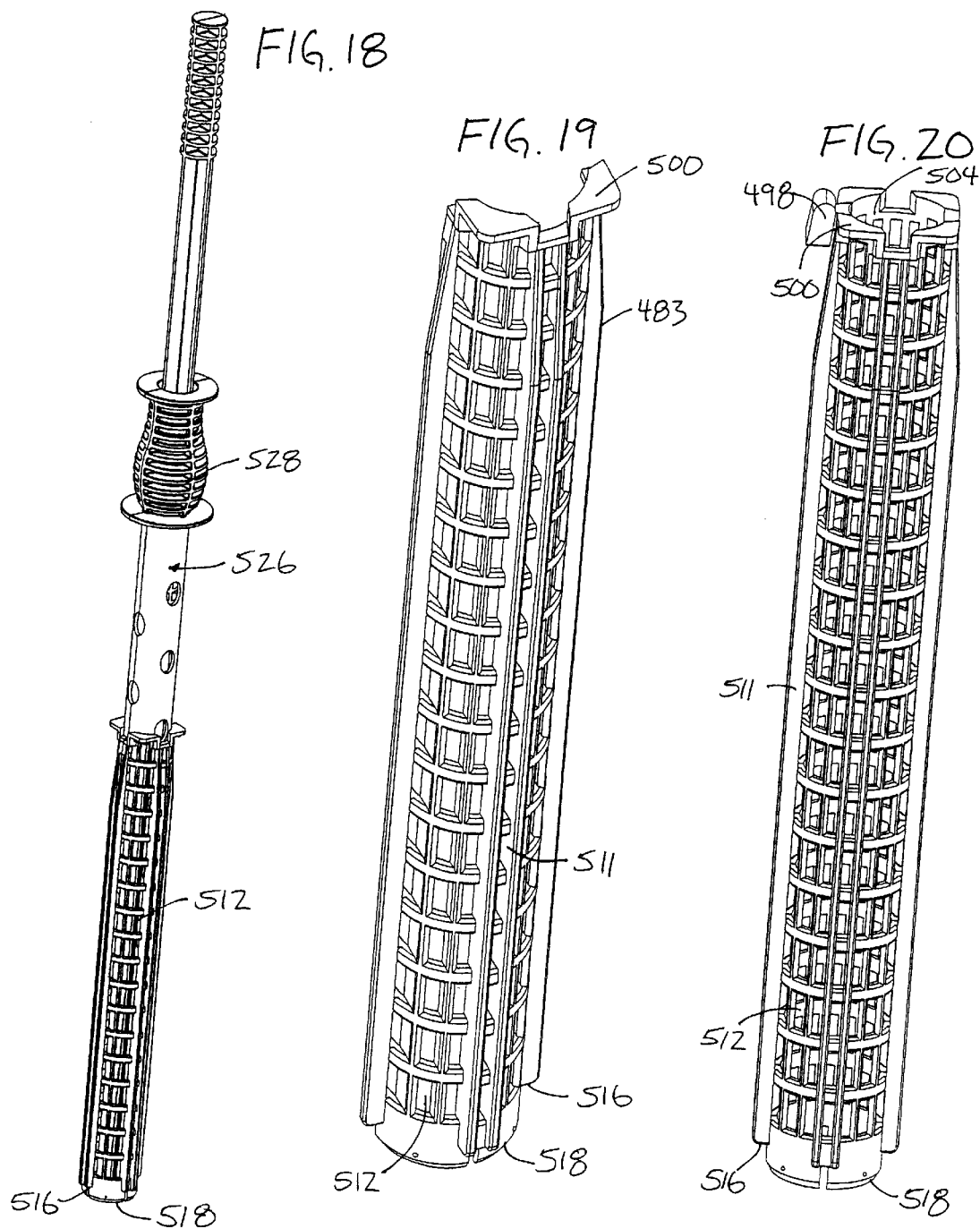

COMBINATION OF CONTAINER FOR GROWING PLANTS AND AERATING ROOT PRUNER

This invention relates to a combination of a container for growing plants and an aerating root pruner, to multi-purpose water filling and leveling systems and to devices and elements relating thereto. This application is a continuation-in-part of application Ser. No. 08/488,289, filed Jun. 7, 1995, now U.S. Pat. No. , 5,918,415, whose disclosure is incorporated herein by reference, and relates to applications Ser. No. 08/488,292, now U.S. Pat. No. 5,782,035, and Ser. No. 08/479,712, now U.S. Pat. No. 5,678,600, filed on even date therewith.

BACKGROUND OF THE INVENTION

Our parent application claims an improvement in the art of self-watering systems which comprise a water holding basin; a water using attachment adapted for mounting thereon; locking means for mounting and locking the water using attachment on the basin; means comprising a water conduit for transporting water to the basin; means comprising a fill valve for filling the basin with water to a selected water level line which leaves air space above the surface of the water when the basin is filled with a volume of water to the selected water level line; and water transfer means for transferring water from the basin to the water using attachment when the latter is mounted on the former. The improvement claimed therein has (a) a water basin which comprises (i) an axial positioned port in the bottom of the basin which provides access into the interior of the basin for water transported thereto by the water conduit; and (ii) seating means on the interior surface of the basin for securing and mounting the fill valve onto the interior surface of the bottom of the basin over the port therein; (b) a fill valve which is an adjustable diaphragm fill valve which is either water tight mounted or adapted to be water tight mounted on the interior surface of the bottom of the basin and is adapted to maintain the volume of water in the basin at the selected water level line and comprises a water inlet port adapted for water tight connection through the port in the bottom of the basin to the water conduit and for receiving water from the source thereof; a water outlet port for dispensing into the basin water received from the inlet port; and a gas port for maintaining the diaphragm of the fill valve at ambient pressure; (c) a water conduit which projects substantially radially outwardly from the port in the bottom of the basin beyond the side wall of the basin and above the lower edge thereof and is adapted for connection to the source of the water; and (d) the diaphragm fill valve is connected to a gas conduit for accessing the valve to ambient air.

Disclosed therein as examples of water using attachments are a plant pot, an animal waterer/feeder, an underground spring for below-ground watering, a bird bath, a hummingbird feeder, an amphibian habitat, an animal/bird cage, a plant pot and a water toy.

A diaphragm valve suitable for use in the above-described self-watering system is claimed in our parent application is a modification claimed in our '600 patent of the diaphragm valve adapted for use in toilets and claimed in U.S. Pat. No. 4,240,606. Our U.S. Pat. No. 5,743,290 claims an adjustable reservoir fill valve suitable for use in such a self-watering system and a combination thereof with a valve mounting base adapted for mounting the fill valve thereon, which comprises a liquid inlet port adapted to connect it to a source of water under pressure and seating means on the upper surface thereof for detachably mounting the fill valve thereon.

Wicks suitable for use in the water handling devices having water transfer means are described in our parent '289 application and also disclosed in our prior filed provisional application S.N. 60/105,038, filed Oct. 20, 1998.

All of the foregoing is disclosed in PCT application US/96/10493, published Dec. 19, 1996. The references cited in the specifications of these applications and patents and the References Cited therein describe the prior art relevant to the subject matter of this application.

The terms "water" or "liquid" when used herein ordinarily mean municipal tap water or well water but also includes aqueous solutions containing one or more of plant or animal nutrients, pesticides, algaecides, disinfectants and therapeutic agents. Without straying from the scope of the present invention, the basin, its attachments, valve and the portable valve base can be made of materials resistant to corrosive or solvent liquids and therefore enable the invention to utilize other liquids including but not limited to; photo-finishing chemicals, fuels and solvents, plasma, saline solutions, cosmetic and food liquids, fragrances, surfactants, dyes and other liquids at or near the consistency of water.

SUMMARY OF THE INVENTION

In a first aspect, this invention relates to an a combination comprising a container for growing plants having a substantially non-porous and solid side wall and bottom and at least one aerating root pruner (a) which is in the shape of an elongate tube or conduit with a plurality of perforations or openings therein which provide a high ratio of open areas to total vertical wall surface area, (b) which is positioned in or adapted to be positioned at a fixed relatively vertical position proximate to the interior surface of the side wall of the container prior to filling the container with plant growing medium, (c) whose upper end projects nearly to or above the top of the container; (d) whose lower end is positioned proximate the bottom of the container in communication with the atmosphere through a port in the side wall or bottom of the container; and (e) which is removably affixed to the side wall of the container, whereby the pruner can if desired be cleaned interiorly of roots of a growing plant planted in the container which invade the interior of the pruner and can be removed prior to or concurrently with the removal of the growing plant from the container.

In an automatic watering device aspect, this invention relates to an automatic watering device for dispensing water from a source of water under pressure to a growing plant, comprising:

(a) a basin for holding a volume of water, the basin having a closed bottom, at least one side wall and an open top, the basin comprising a water inlet port adapted to connect the basin to the source of water under pressure; and (b) a fill valve mounted on the interior wall of the bottom of the basin for maintaining a volume of water in the basin at a predetermined level, the fill valve comprising:
an inlet in liquid communication with the water inlet port of the basin;
at least one water outlet port for dispensing water from the fill valve into the interior of the basin;

(c) a plate which covers the open top of the basin and which has at least one port therein in liquid communication with a tube or conduit having an open upper end and a closed lower end, whose upper end is mounted on the bottom face of the plate and projects downwardly therefrom and which has a perforated bottom portion which projects below the predetermined level at which the volume of water in the basin is maintained.

BRIEF DESCRIPTION OF THE DRAWINGS

FIG. 6 is an exploded, perspective top view of the basin shown in FIG. 1;

FIG. 7A is a perspective view of the utility bracket and hose adapter assemblies for the basin shown in FIG. 1.

FIG. 7B is a perspective close-up view of the hose adapter with cap and hose for the utility bracket shown in FIG. 7A;

FIG. 7C is a perspective close-up view of the hose adapter and retaining clip for the utility bracket shown in FIG. 7A;

FIG. 7D is a perspective view of the air vent adapter for the utility bracket shown in FIG. 7A;

FIG. 7E is a perspective view of the valve mounting flange, and basin insertion plugs as shown in FIGS. 1, 5 and 6;

FIG. 10 is a perspective view of the gardener attachment for the basin shown in FIG. 1;

FIG. 11 is a perspective view of the square embodiment of the gardener attachment for the basin shown in FIG. 1

FIG. 12 is a perspective bottom view of the gardener attachment for the basin shown in FIG. 1;

FIG. 13 is a perspective top view of the gardener attachment for the basin shown in FIG. 1 with the manual filler installed;

FIG. 14 is an exploded perspective view of the gardener attachment shown in FIG. 10 with optional aerating root pruners and dividers installed;

FIG. 15 is a perspective view of the divider panel for the aerating root pruners and gardener attachment shown in FIG. 14;

FIG. 16 is a perspective view of the interlocking divider panels that fit the gardener attachment shown in FIG. 10;

FIG. 17 is an exploded perspective view of the square gardener attachment shown in FIG. 11 with optional aerating root pruners and dividers installed;

FIG. 18 is an exploded perspective view of the aerating root pruner shown in FIG. 14 with the cutting tool and cutting tool plunger;

FIG. 19 is a perspective view of the aerating root pruner part before fusing and creating the aerating root pruner assembly shown in FIG. 18;

FIG. 20 is a perspective view of the aerating root pruner assembly after fusing as shown in FIG. 18;

DESCRIPTION OF THE PREFERRED EMBODIMENTS OF THE INVENTION

Figure 1:
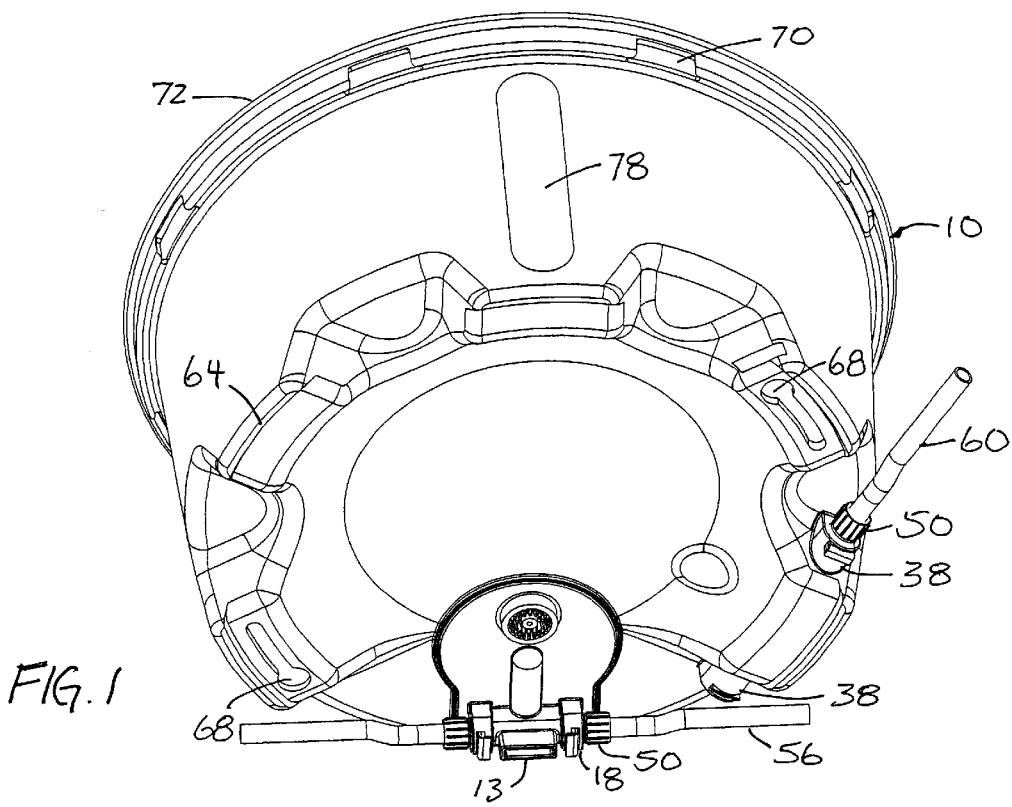
FIG. 1 is a perspective bottom view of the basin in one functional configuration.
Figure 2:
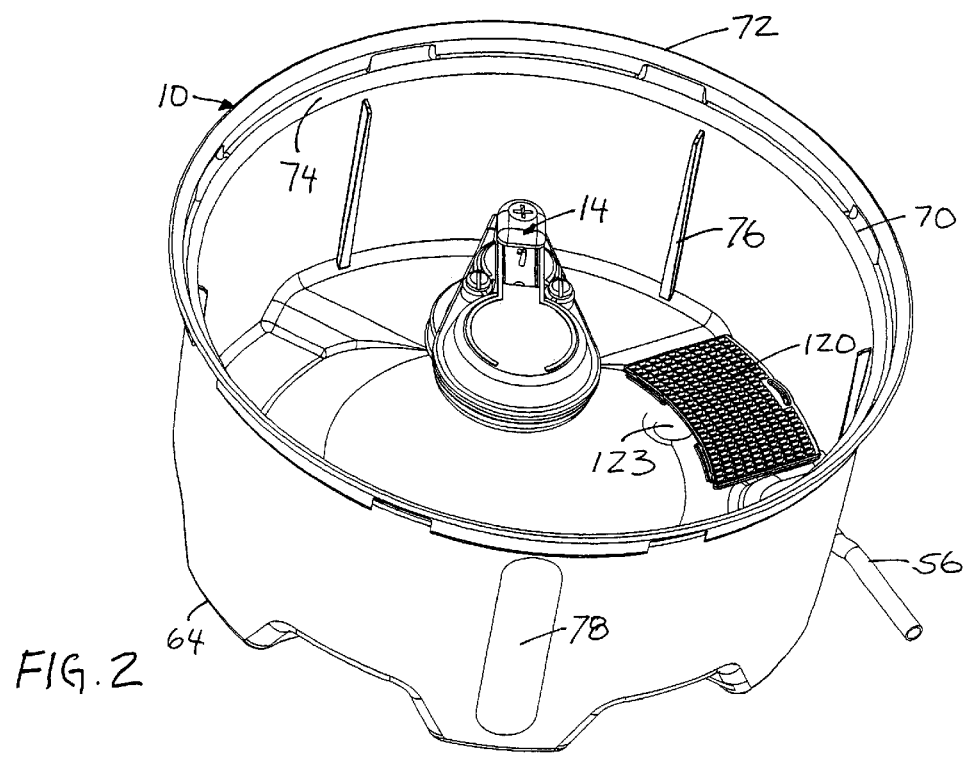
FIG. 2 is a perspective top view of the basin assembly shown in FIG. 1.
Figure 3:
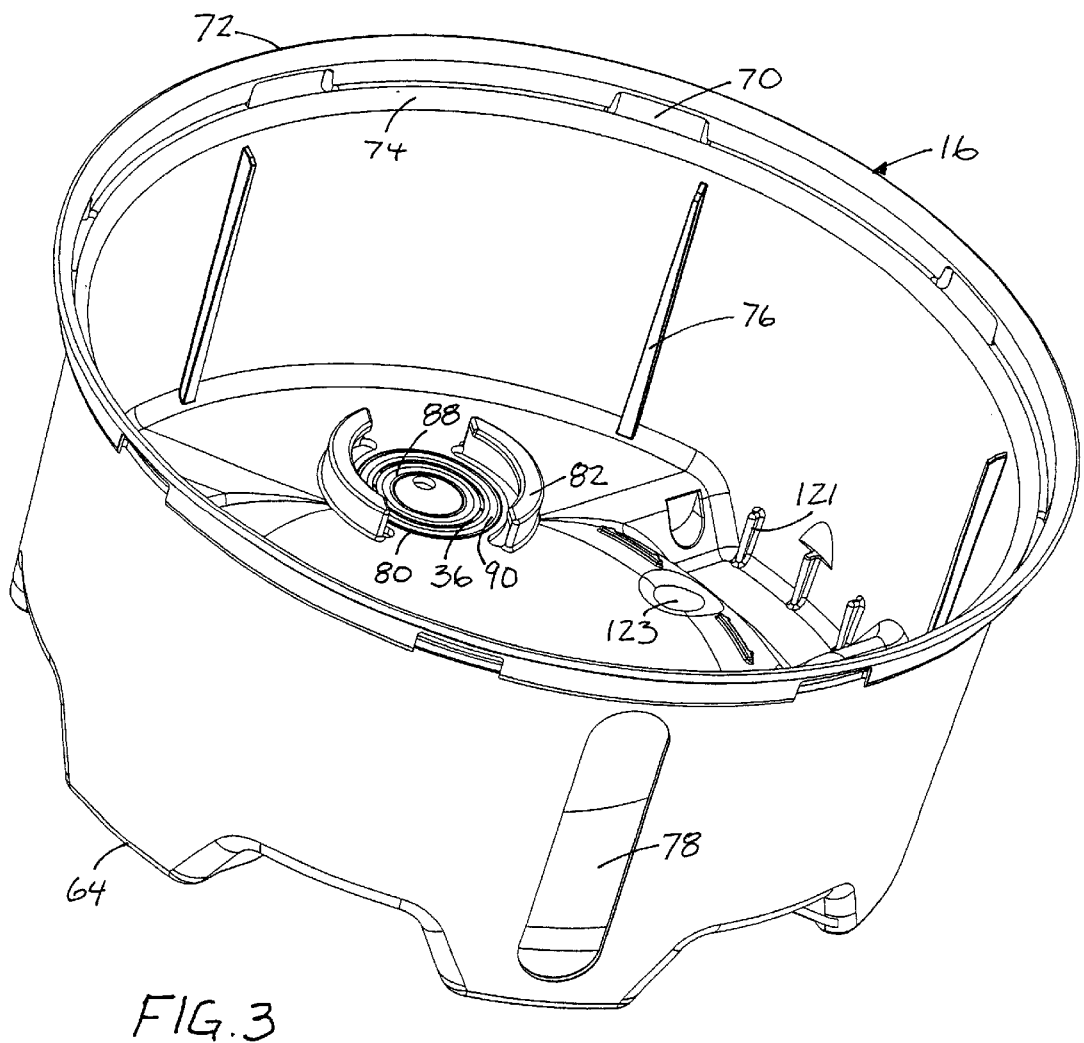
FIG. 3 is a perspective top view of the basin body before being mated to the utility bracket and fused together.
Figure 4:
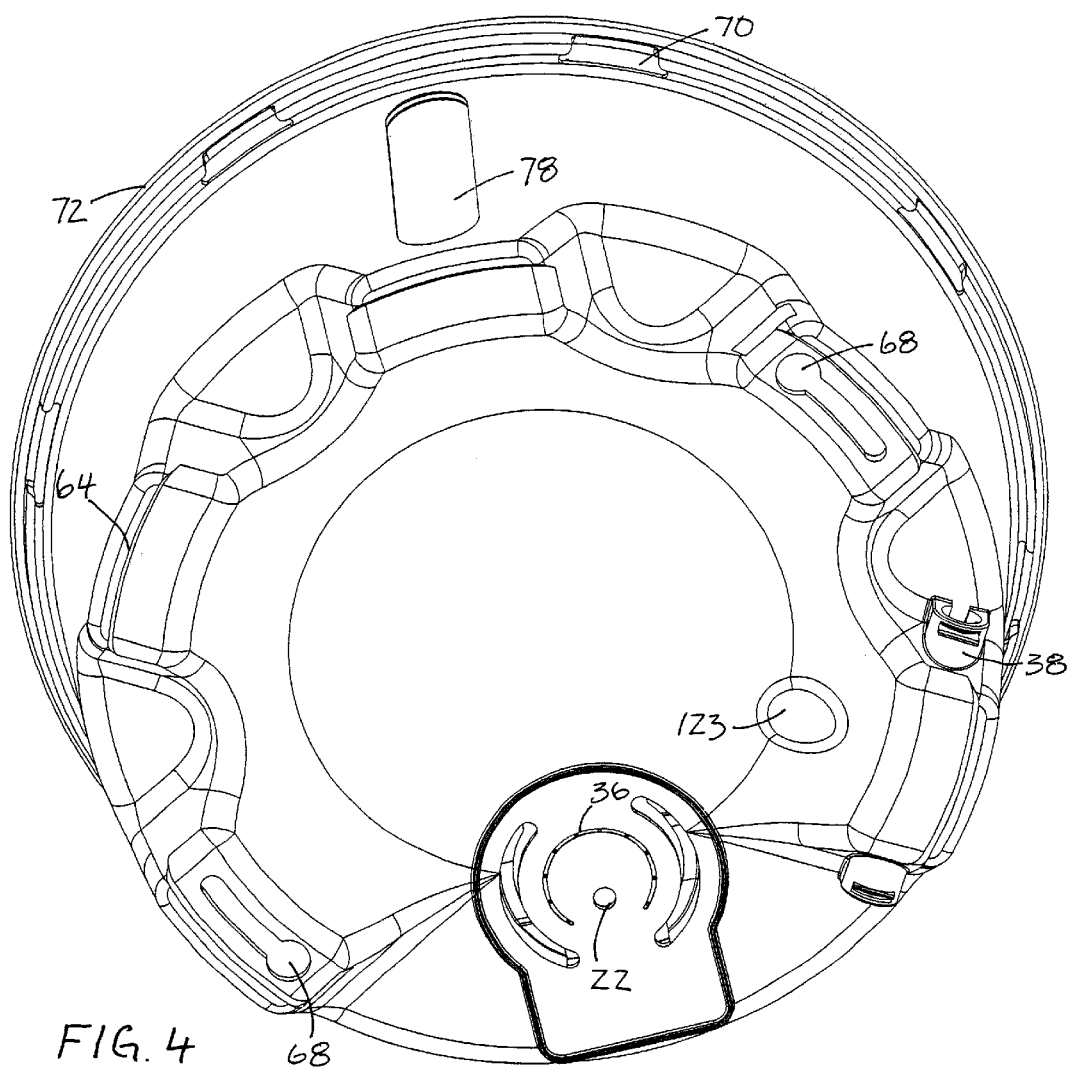
FIG. 4 is a perspective bottom view of the basin body shown in FIG. 3 before being mated to the utility bracket and fused together.
Figure 5:
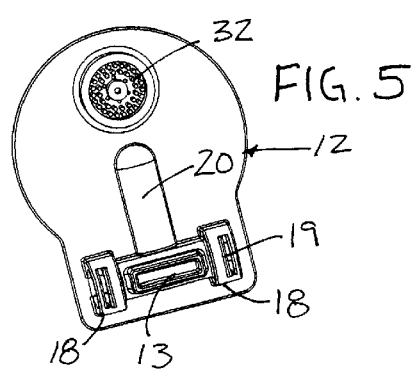
FIG. 5 is a perspective bottom view of the utility bracket before being mated to the basin shown in FIG. 4 and fused together.
Figure 8:
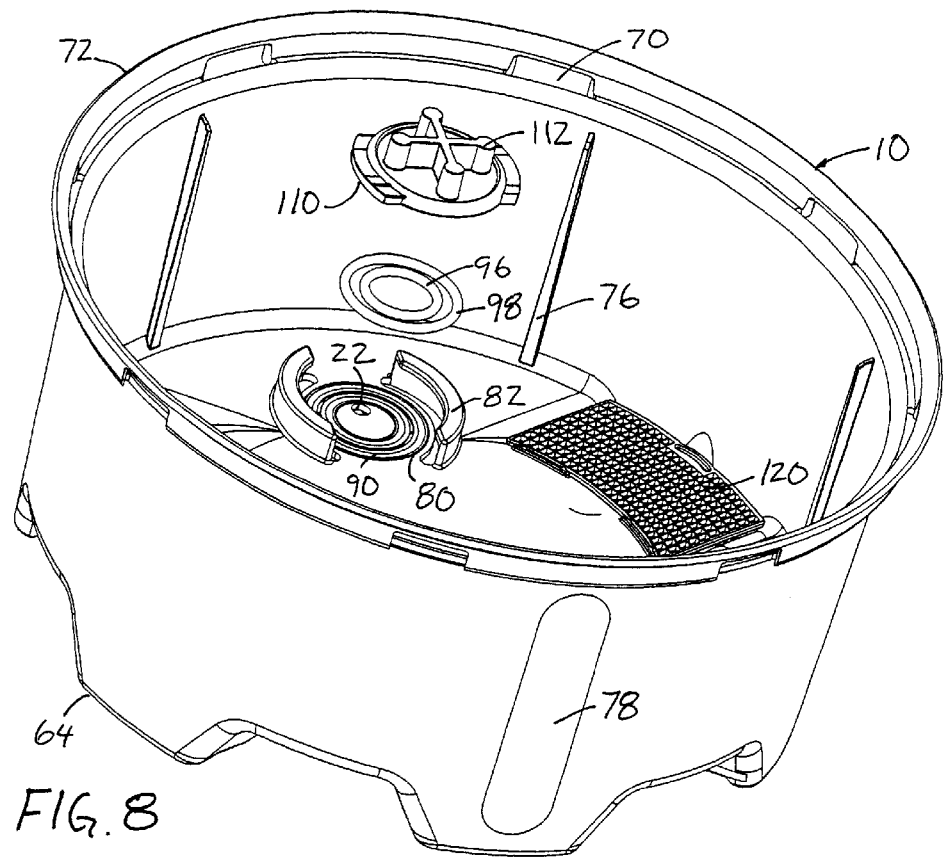
FIG. 8 is an exploded, perspective top view of the basin shown in FIG. 3 with the basin plug and o-rings.

The Multi-purpose Automatic Water Filling and Leveling Systems and Related Devices comprise a water holding vessel called the basin 10 which can be of any size or shape and will in most cases be produced by injection molding using plastics. The basin 10 accepts within it a readily detachable fill valve 14 that is connected to a pressurized water supply. The valve fills and maintains the level of water in the vessel which level can be preset by the factory or selected and adjusted by the user.

The basin 10 is composed of two primary components ultrasonically welded together to form a water and air-tight one piece unit. These components are called the basin body 16 and the utility bracket 12. In addition to these fused parts are; the twist-in valve base compression cam equipped automatic filling and leveling diaphragm valve 14; an air isolating gasket 98 and a matching water isolating gasket 96 that seal the areas between the valve 14 and the basin body 16, the hose adapter fittings 50 that fit the pressurized water line ports 18 and external drain line port 38 and the optional basin drain screen 120. The utility bracket 12, when fused to the basin body 16, performs three functions:

Water, preferably filtered, is delivered from any pressurized source through a standard small guage water delivery line 56 (commonly referred to as drip irrigation line) which is connected to the hose adapter 50 which in turn is inserted into the pressurized water inlet/outlet port/s 18 of the utility bracket 12. The utility bracket 12 is molded with diaphragms at each of the basin 10 water ports 18 and 60, which seal the basin until punctured by the adapter cutting tip 52 on the insertion end of the hose adapter 50. Water flows through the pressurized water channel 20, through the hose adapter 50, through the internal water port 22 on the bottom of the basin 10 and into the valve 14.

Ambient air for operation of the diaphragm valve 14, passes through the air vent 32 located on the bottom of the utility bracket 12, then up through the bottom of the basin 10, through the internal air channel 36, into the valve base air port and into the underside of the diaphragm in the valve 14.

Water is drained from the basin 10 by connecting a hose adapter 50 to the external drain line port 38 and installing the optional basin drain screen 120 to prevent fouling of the drain lines. By connecting a small guage drain discharge line 60 the user may drain the basin and can optionally use a standard drain regulating valve to control drain flow rates based on the attachment used and the requirements or desires of the user.

When ultrasonically fused together, the basin body 16 and the utility bracket 12 fit together and create air and water tight seals around both of functional areas (air and pressurized water structures) listed above. After ultrasonic welding, the utility bracket foot 13 substitutes for one of the basin feet 64 and completes the 'footprint' of the basin. For ease of storage and shipping the basin 10 stacks and nests at approximately ⅗ths of its own height by sitting on the basin stacking supports 76, which surround the interior of the basin. After installing the water isolating gasket 96 in the water gasket trough 88, and the air isolating gasket 98 in the air gasket trough 90, the valve 14 twists into the valve mounting seat 80 by slipping down past the retention tabs 82, (2 each opposing) and twisting approximately 90 degrees until the retention tab compression cams and the valve base compression cams mutually engage forcing the valve downward until the retention tabs stop the valve rotation. The twisting, downward motion during valve 14 insertion, compresses the larger diameter air isolating gasket 98 and the smaller diameter water isolating gasket 96 downward and outward into their respective troughs 88 and 90 which border the internal air channel 36 which is an isolated encircling trough allowing ambient air portage even in the event of incomplete positioning of the valve 14.

To function automatically, the basin 10 with the fill valve 14 installed must be connected to a pressurized water line between 5 psi and 80 psi. The user may adjust the level of the water in the basin 10 by use of the valve adjusting screw 15, located on the top of the valve 14, which increases or decreases the water level and maintains it at the selected level. The maximum water level is established by the user and requirements of the attachment connected to the basin 10, but is always below the basin vent/latch ports 70 of the basin. The user may monitor the water level in the basin 10 by using the water level sight glass 78 on the 'front' wall of the basin. The basin 10 and all of its attachments will operate at the minimum water level, thus allowing the user (or environmental forces) to tilt the basin ten degrees or less without spilling water. The valve 14 and its water level control performance is unaffected by tilting.

To function manually (without the valve 14 in place) the basin 10 requires the basin plug 110 be twisted by hand (with the water and air isolating gaskets 96 and 98 in place) using the basin plug finger key 112 molded on the top of the plug. The manual operation insertion plug 110 is, on its lower portion, identical in shape to the fill valve 14 base, and like the valve base has opposing cams. When installed into the valve mounting seat 80, the insertion plug 110 seals the internal water port 22 and the internal air channel 36 and turns the basin 10 into a reservoir that can be filled by the user. When used with the gardener attachment 462 the manual filler 582 is used to fill the basin 10.

To function in series, a 'controlling' basin 10 with valve 14 installed is connected to a series of additional 'passive' basins that are all on the same level surface as the controlling basin. The controlling basin 10 is connected to a pressurized water supply and then an additional water delivery line 56 is connected to the basin external drain line port 38, and from there to the external drain line ports of the remaining basins 10 in series. Each basin 10 has two each of the pressurized 18 and drain 38 ports and can be connected together one to the other without using additional adapters or "T" fittings.

Attachments for the basin 10 all sit on the basin seating rim 74. The attachments sit on the basin 10 and snap into and out of place with a simple push or pull (depending on attachment style) by one finger on one or both of the latches of the attachment. To facilitate comfortable handling, the bottom edge of the basin 10 is rounded, as are the basin rim 72 and all the basins external and internal edges except the deliberate right angle on the interior and exterior edges of the basin seating rim 74.

The basin 10 can be made in any shape or size using the same fill valve 14, utility bracket 12 and related fittings, drain screen 120 and water level sight glass as in the present embodiment. Some examples would be a square basin, a rectangular basin, a doughnut shaped basin, a semi-circular basin and a "L" shaped basin.

Additional accessories for the basin 10 include, but are not limited to;

(a) An optional heater comprising a conductive element and thermocouple encased in a waterproof heat resistant injection molded shell formed to fit the basin 10 and integrally molded to a waterproof electrical terminal that snaps into and passes through the basin vent/latch ports 70 on the upper rim of the basin and is connected by a heater plug and cord to a controller, thermostat and power supply appropriate to the requirements of the basin and attachment size, style and function.

(b) An optional centrifugal submersible water pump can power accessories for all the basin 10 attachments. The pump fits on the bottom interior floor of the basin 10, and delivers water by water conduit to any of the accessories that utilize it. The water pump is connected to its power source with a waterproof male electrical terminal that snaps into and through the basin vent/latch ports 70 on the upper rim of the basin 10 and is connected by a pump plug and cord to the controller and a power supply appropriate to the requirements of the basin and the attachment size, style and function.

The basin vent/latch ports 70 allow ambient air to enter the basin 10 when attachments are in place except when the user rotates those attachments (that can do so) and diminishes or cuts entirely the flow of ambient air into the basin. The basin 10 accepts the attachments using their respective latches that all fit the basin vent/latch ports 70.

The Valve

Figure 9:
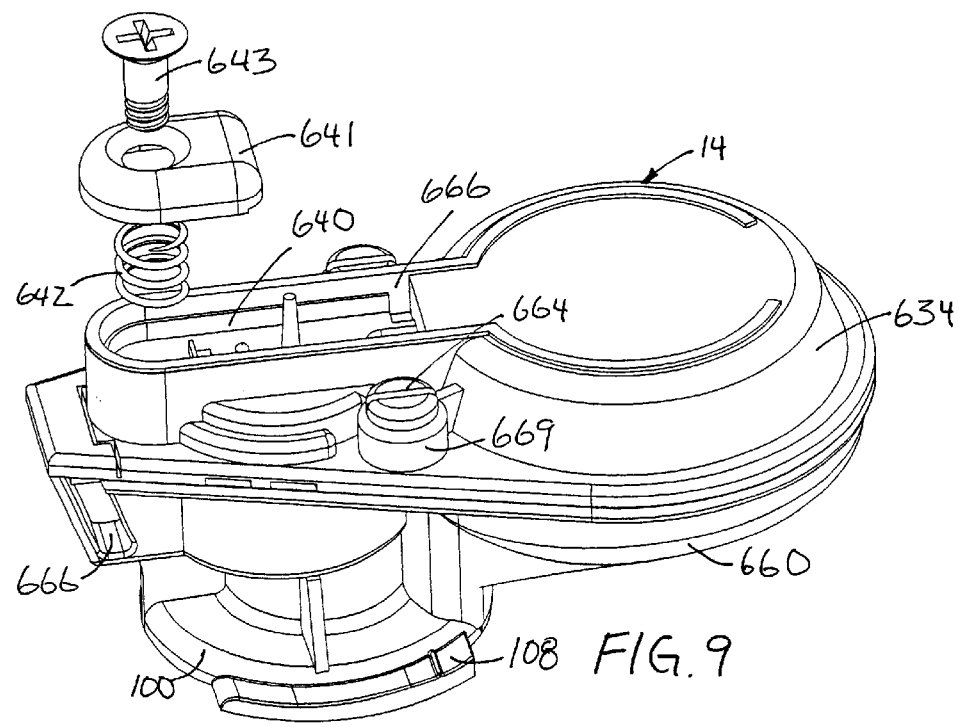
FIG. 9 is a perspective view of the fill valve that fits the basin shown in FIG. 2.
Figure 21:
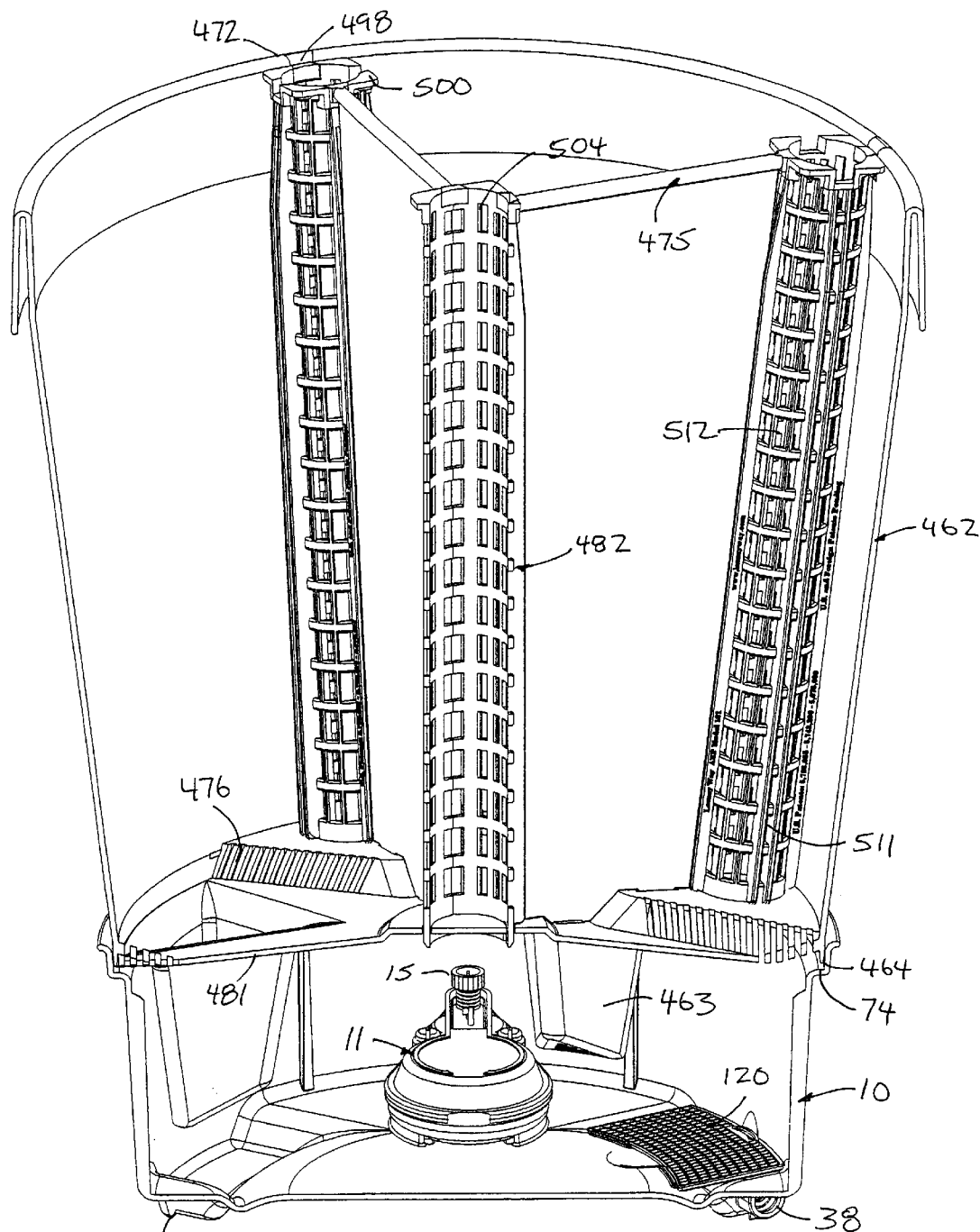
FIG. 21 is a perspective section view of the complete basin as shown in FIG. 2 with the gardener as shown in FIG. 14 attached.
Figure 22:
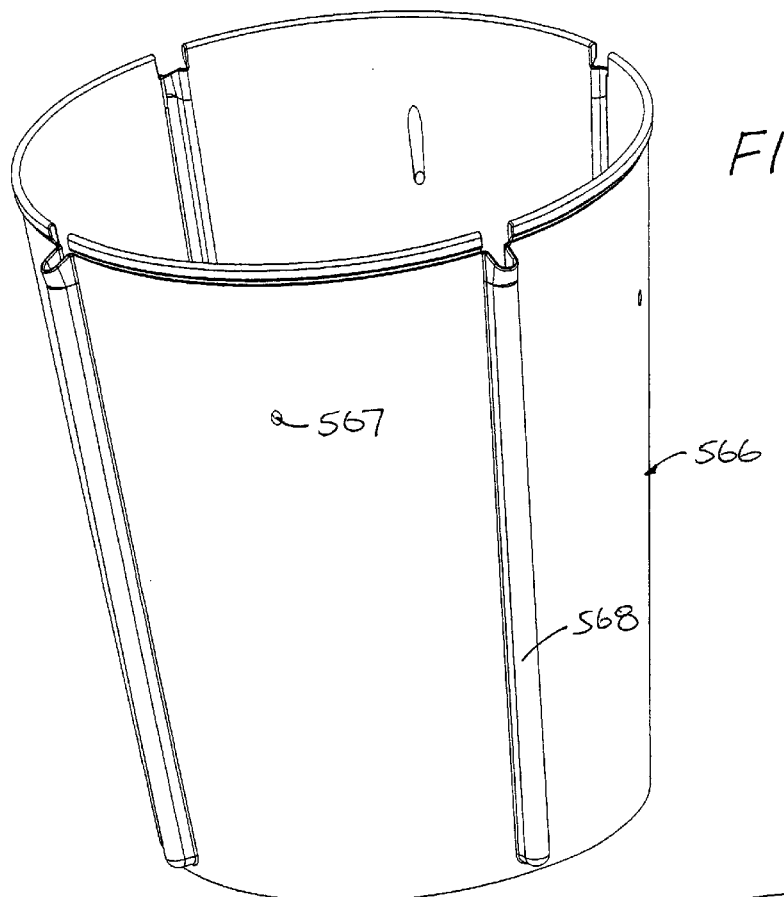
FIG. 22 is a perspective view of the bury bucket that accepts the gardener attachment shown in FIG. 21.
Figure 23:
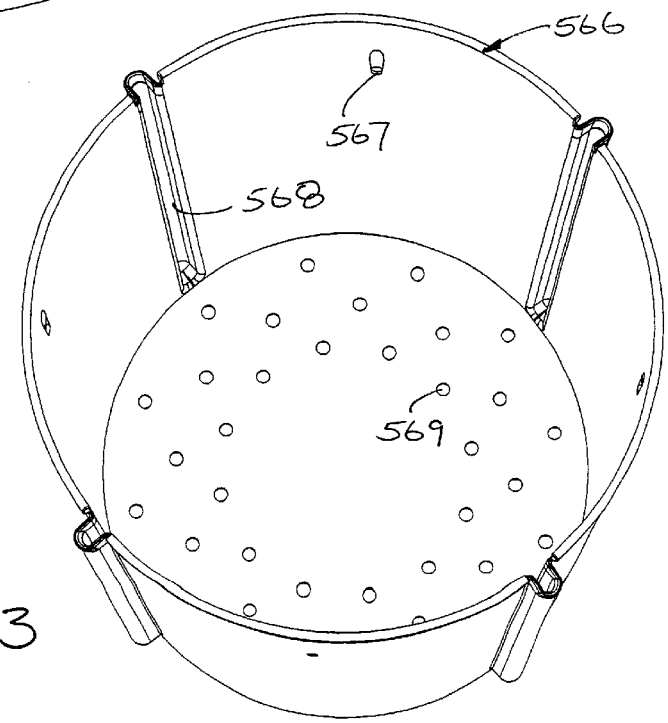
FIG. 23 is a perspective top view of the bury bucket shown in FIG. 22.
Figure 24:
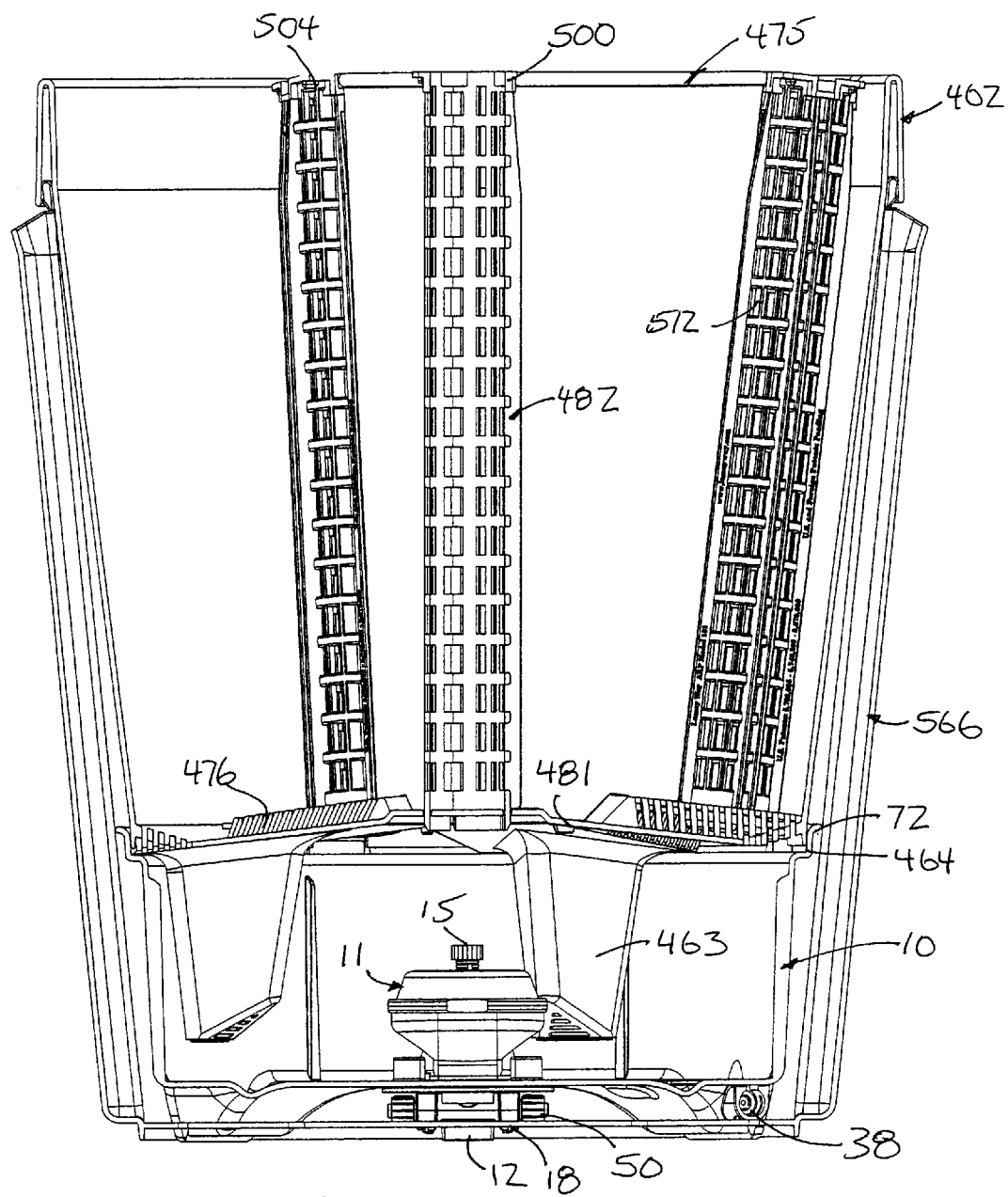
FIG. 24 is a perspective section view of the bury bucket shown in FIG. 21 combined with the gardener and basin assemblies shown in FIG. 21.
Figure 25:
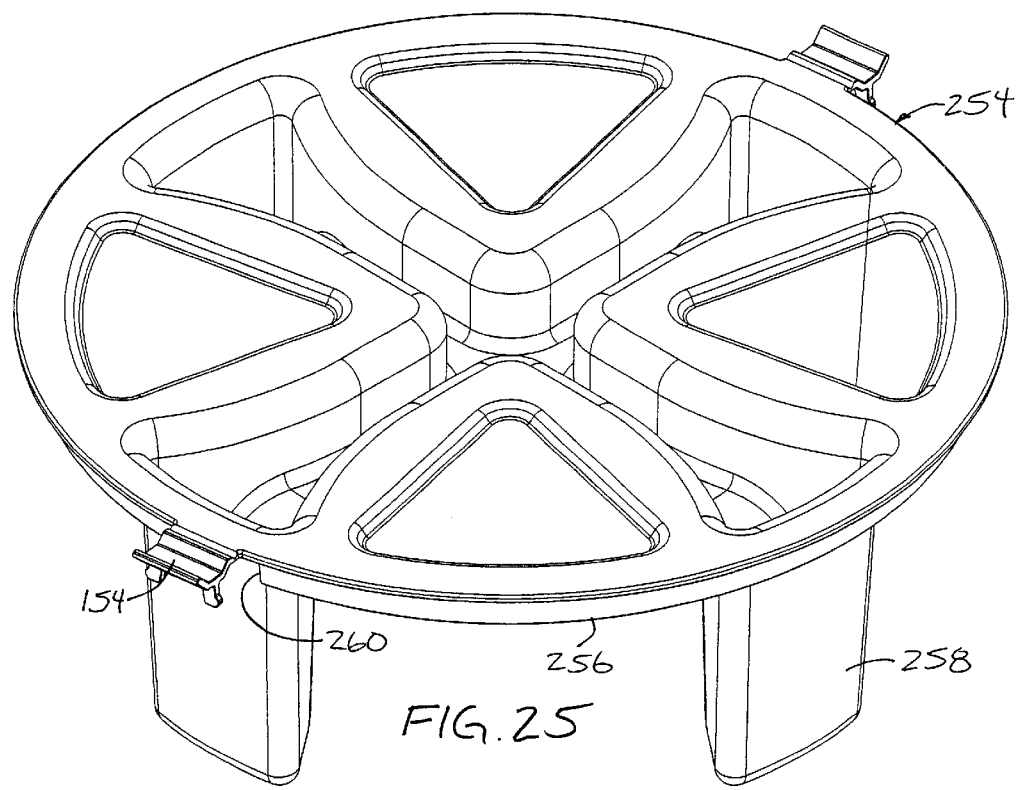
FIG. 25 is a perspective top view of the underground spring attachment that fits the basin shown in FIG. 2.
Figure 27B:
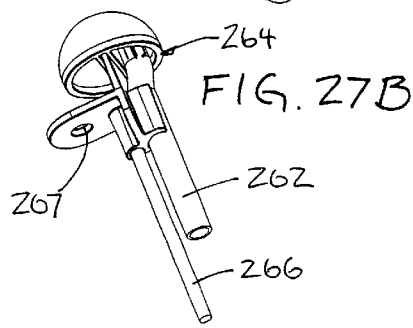
FIG. 27B is a perspective view of the external snorkel and cap which connect to the basin shown in FIG. 1.
Figure 26:
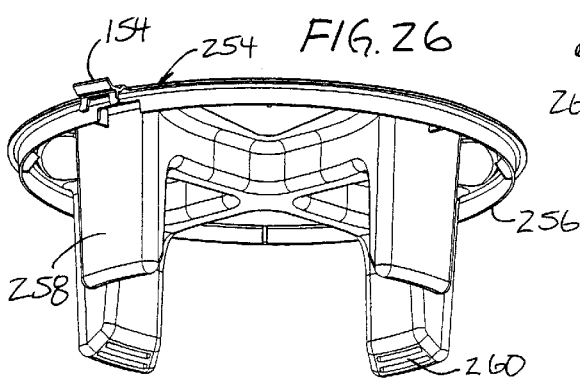
FIG. 26 is a perspective bottom view of the underground spring attachment that fits the basin shown in FIG. 2.
Figure 27A:
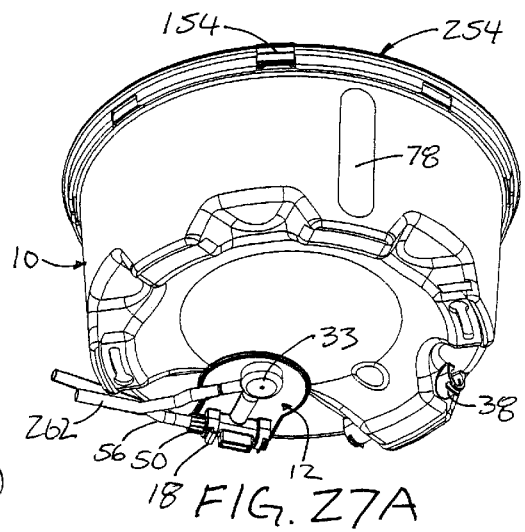
FIG. 27A is a perspective bottom view of the underground spring attachment connected to the basin shown in FIG. 1.
Figure 28:
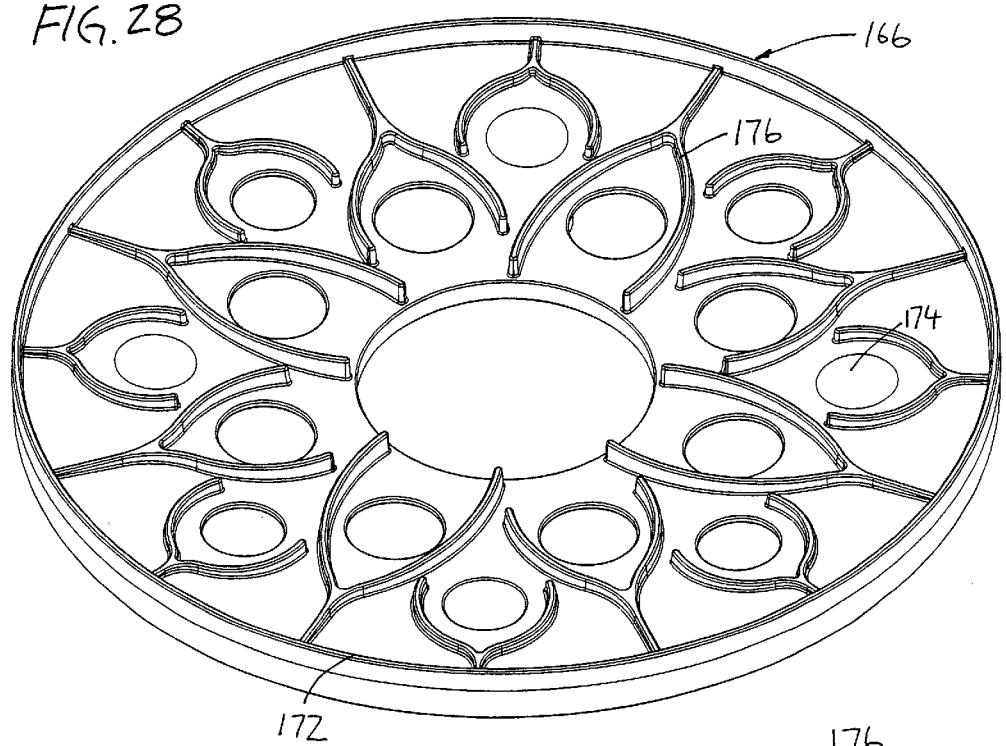
FIG. 28 is a perspective top view of the pot converter attachment that connects to the basin shown in FIG. 2.
Figure 30:
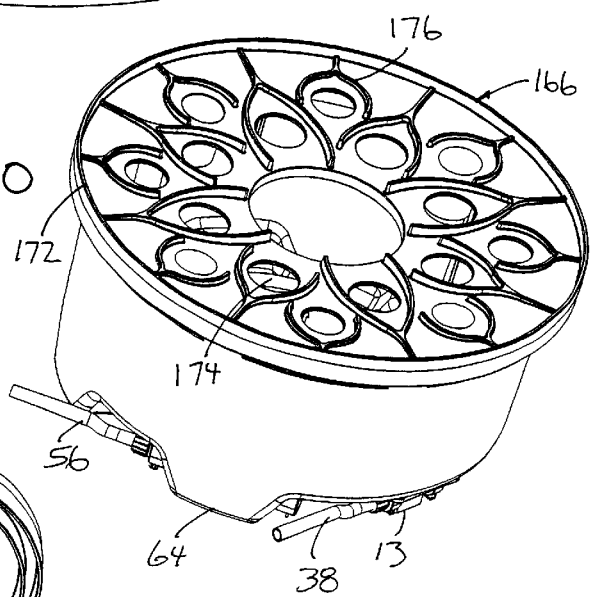
FIG. 30 is a perspective top view of the pot converter attachment connected to the basin shown in FIG. 2.
Figure 29:
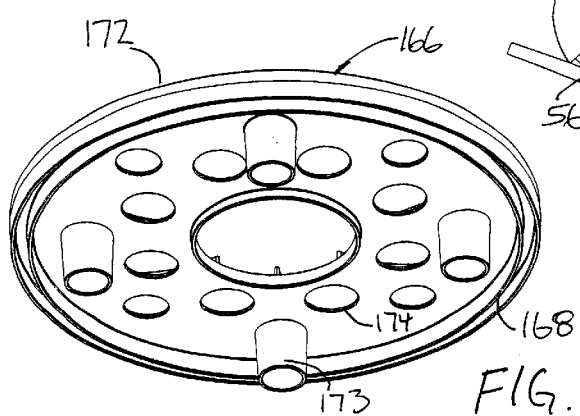
FIG. 29 is a perspective bottom view of the pot converter attachment that connects to the basin shown in FIG. 2.
Figure 31:
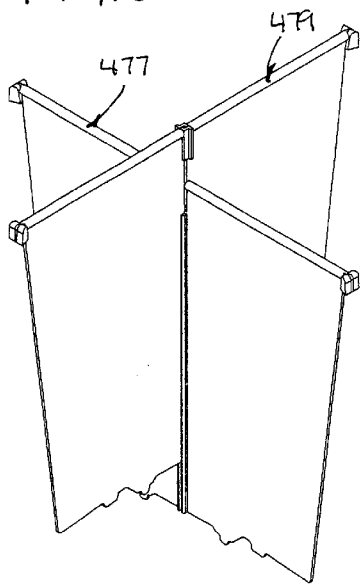
FIG. 31 is a perspective view of the dividers shown in FIG. 16 that fit the multi-purpose planter shown in FIG. 32.
Figure 32:
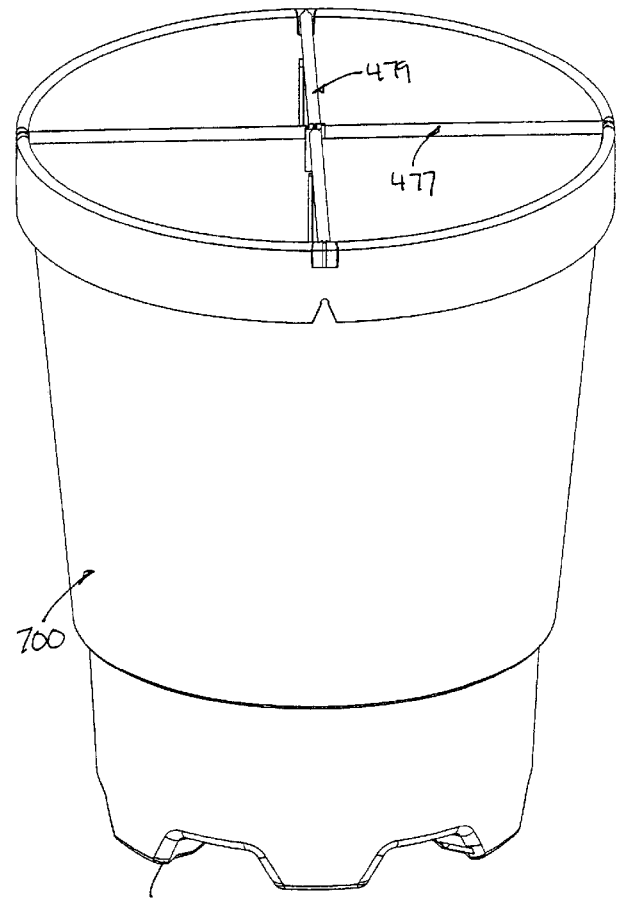
FIG. 32 is a perspective view of-the multi-purpose planter with the dividers shown in FIG. 31 and containing all of the assemblies shown in the basin of FIG. 2.
Figure 33:
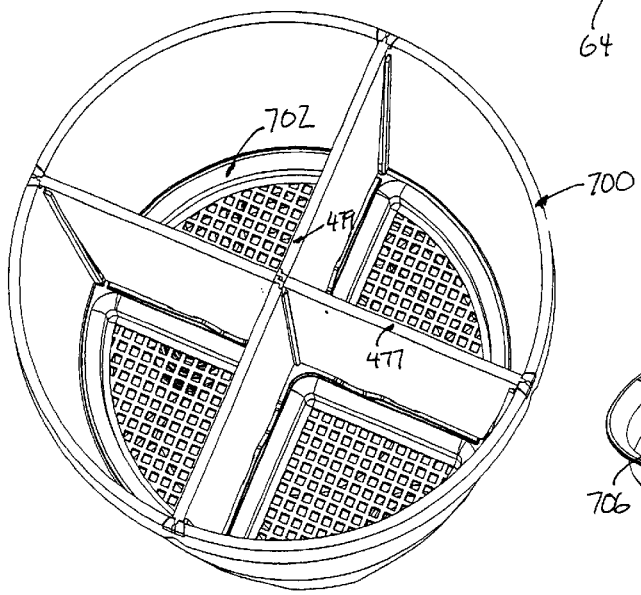
FIG. 33 is a perspective top view of the multi-purpose planter with dividers as shown in FIG. 31 and containing all of the assemblies shown in the basin of FIG. 2.
Figure 34:
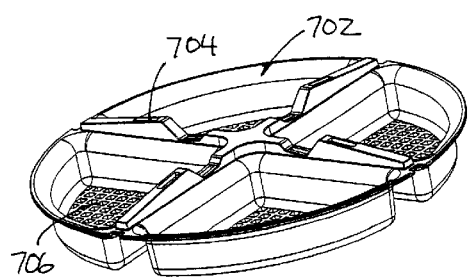
FIG. 34 is a perspective view of the multi-purpose planter tray insert for the multi-purpose planter shown in FIG. 33.
Figure 35:
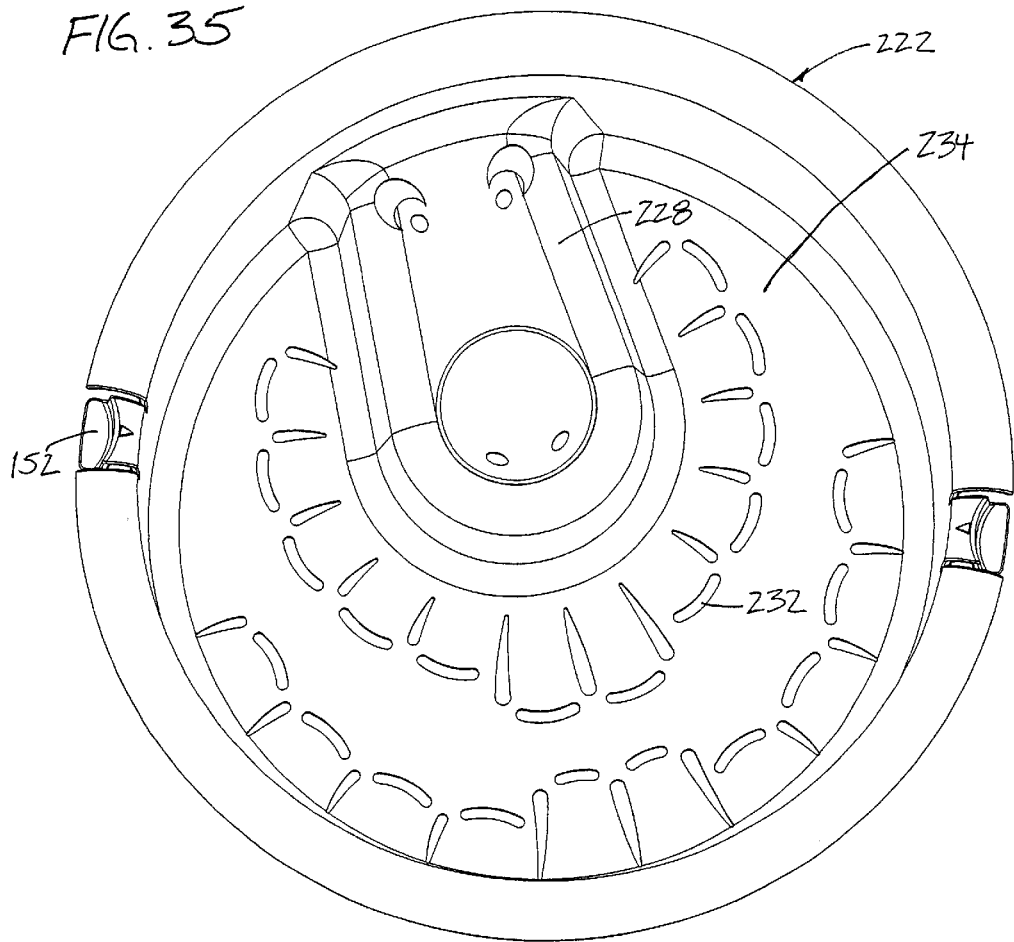
FIG. 35 is a perspective top view of the animal waterer attachment that connects to the basin shown in FIG. 2.
Figure 36:
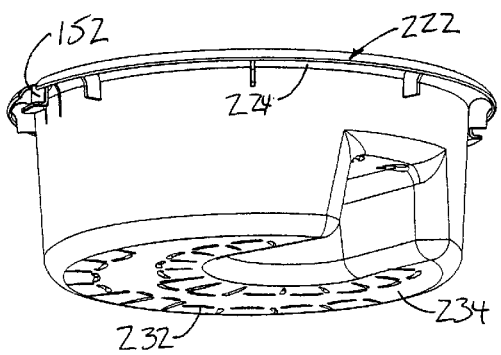
FIG. 36 is a perspective bottom view of the animal waterer attachment that connects to the basin shown in FIG. 2.
Figure 37:
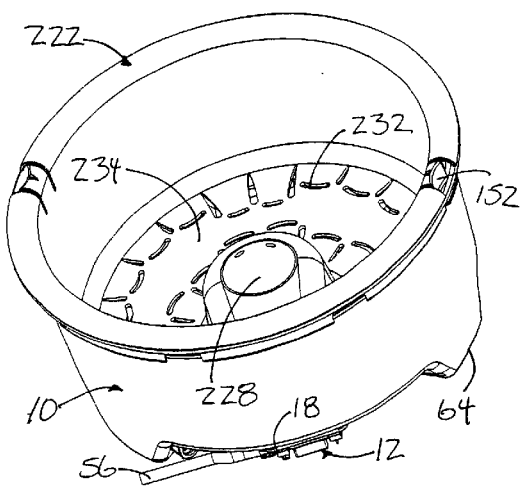
FIG. 37 is a perspective top view of the animal waterer attachment connected to the basin shown in FIG. 2.
Figure 38:
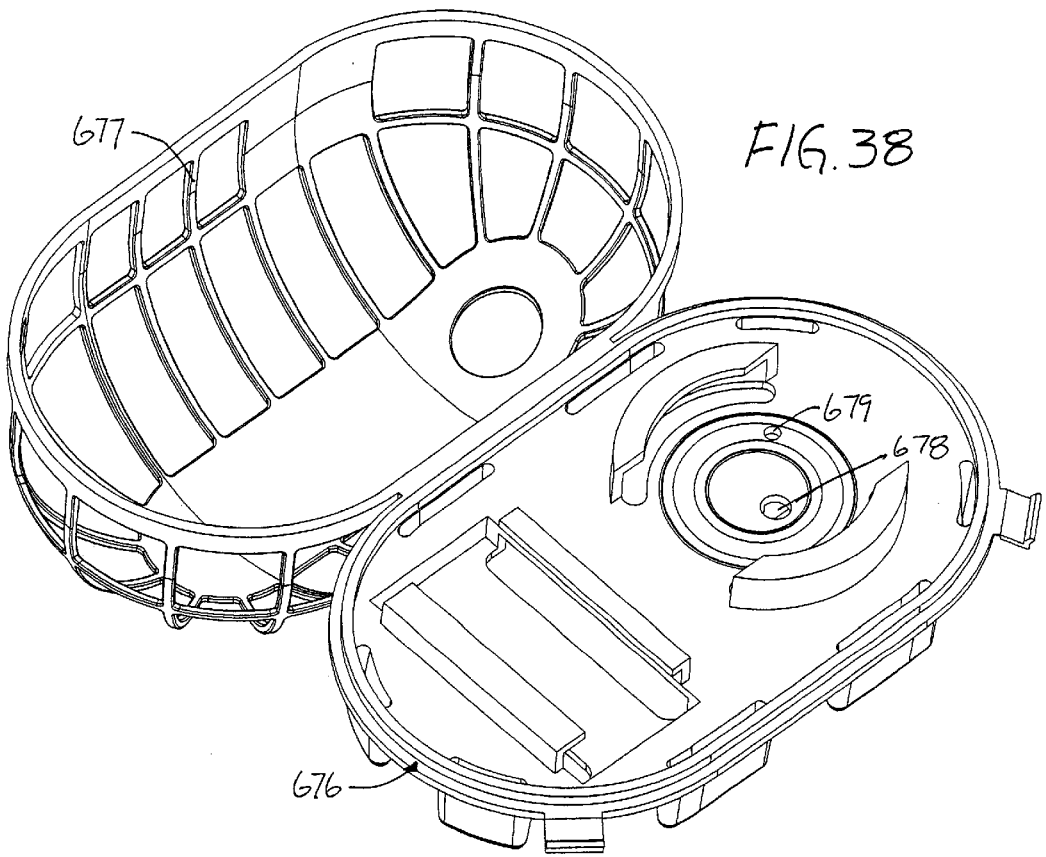
FIG. 38 is a perspective top view of the portable valve base as molded which accepts the fill valve shown in FIG. 9.
Figure 39:
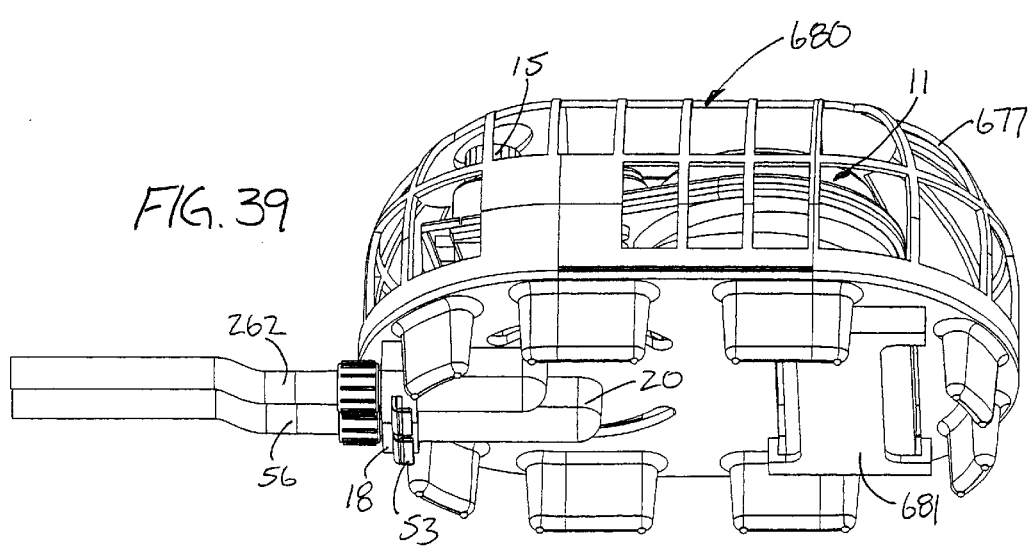
FIG. 39 is a perspective bottom view of the portable valve base shown in FIG. 38 complete with the fill valve shown in FIG. 9, ballast and hose connectors shown in FIG. 7A through 7C.
Figure 40:
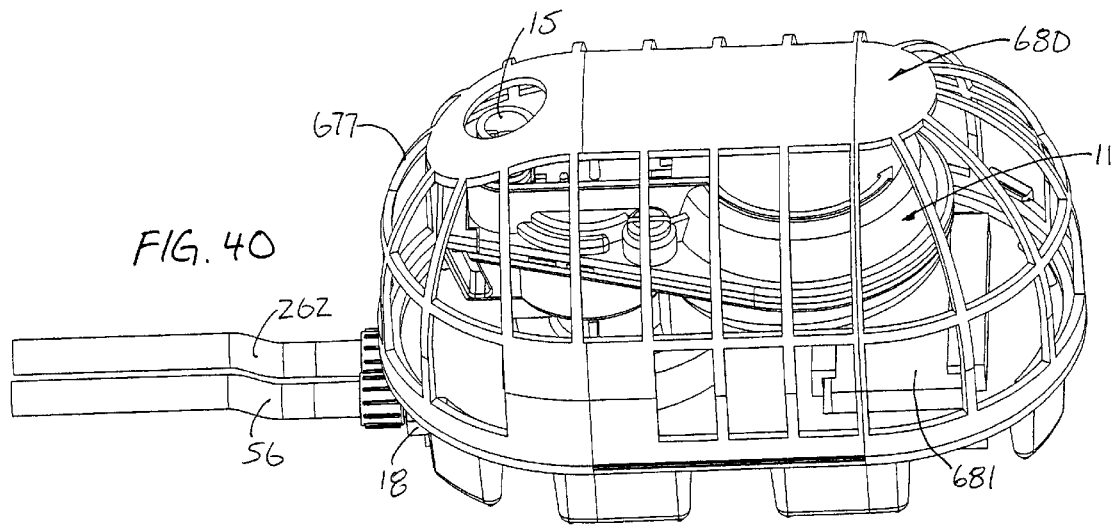
FIG. 40 is a perspective top view of the portable valve base shown in FIG. 39 complete with the fill valve shown in FIG. 9, ballast and hose connectors shown in FIG. 7A through 7C.
Figure 41:
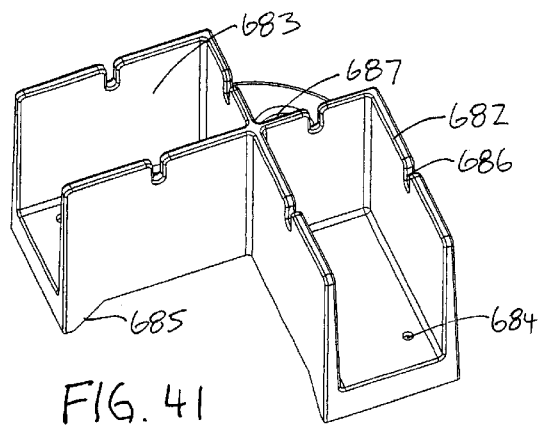
FIG. 41 is a perspective top view of the portable garden bracket used to create a reservoir that can be filled by the portable valve base and fill valve shown in FIG. 40.
Figure 42:
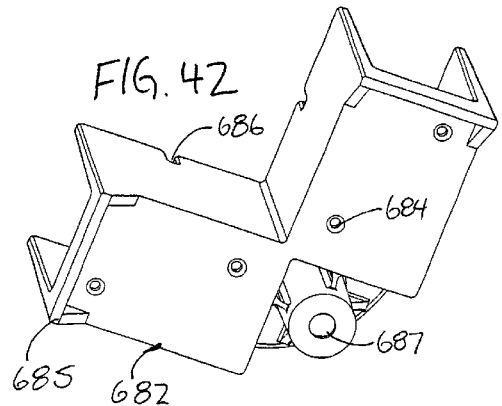
FIG. 42 is a perspective bottom view of the portable garden bracket used to create a reservoir that can be filled by the portable valve base and fill valve shown in FIG. 40.
Figure 43:
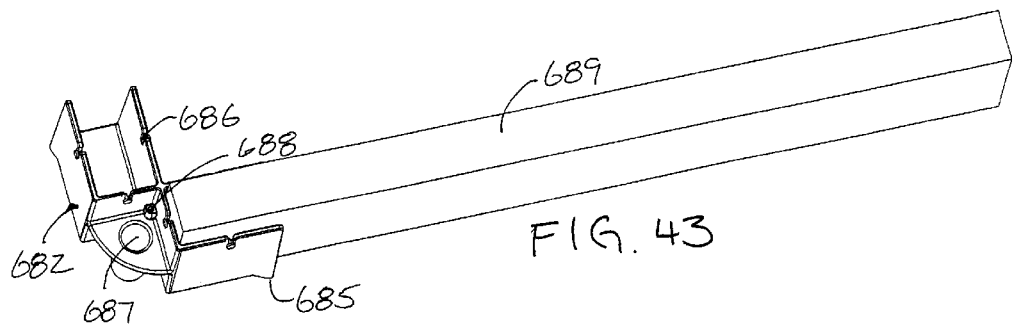
FIG. 43 is a perspective top view of the portable garden bracket with a typical 2×4 wood board used to create a reservoir that can be filled by the portable valve base and fill valve shown in FIG. 40.

The valve of the present invention shown in FIG. 9 is a modification of a valve originally conceived of and designed for use in toilets by Dwight N. Johnson of California. (U.S. Pat. 4,240,606, Dec. 23, 1980) incorporated herein by reference. This valve is currently being manufactured under the name FILLpro Toilet Tank Fill Valve and according to the manufacturer (Delta/Peerless Faucet Corp.) over ten million of the valves have been distributed worldwide since its inception. The mode of attachment of the valve of FIG. 9 must be completely redesigned and the adjusting screw and spring must be shortened to fit and operate with the present invention.

No modifications to the valve body itself as disclosed in U.S. Pat. 4,240,606 nor to its mechanism have been made, so the functionality of the valve is unaffected. Specially modified versions of the FillPRO valves have been operating continuously in test units that mimic the present invention in all of its embodiments. The tests have shown that both the anti-siphon and the standard models of the FillPRO valve are capable of reliable, long term, regulated flow rates as low as one drop per minute. Its inherent nature as a toilet valve, (requiring appropriate flow rates) means the valve is also able to respond quickly when needed with outstanding flow performance, plus the valve is extremely quiet. The valve functions effectively at any angle up to 30 degrees on any axis and is able to maintain a water level less than 6 millimeters above its own body (or fill a vessel many feet over its own body) and to do so repeatedly (for years) with excellent accuracy. The test valves have been disassembled and reassembled repeatedly with no change in performance and all of their parts are user replaceable.

The patent of Dwight N. Johnson (numbered U.S. Pat. 4,240,606 and describing a Fill Valve) is incorporated into this disclosure with the following modifications:

Water is delivered to the valve by the means and method disclosed in this application in the Description of the Preferred Embodiment of the Invention; paragraph three.

Ambient air as required by the valve is provided by the means and method disclosed in this application in the Description of the Preferred Embodiment of the Invention; paragraph four.

Connection and operation of the valve and the means and method thereof are disclosed in the Description of the Preferred Embodiment of the Invention; paragraphs 1–4, 6 and 7.

Summary of the Preferred Embodiments of the Attachments to the Invention

Gardener Attachment

The gardener attachment 462 (gardener) for the basin 10 creates a multi-featured plant growing system. The user places the gardener attachment 462 onto the basin 10 by matching the gardener to the basin seating rim 74 and rotating the attachment until the two opposing gardener latches 162 engage the basin vent/latch ports 70. If the user wishes the latches 162 need not be egaged in the basin vent/latch ports 70 allowing the garderner 462 to rotate on the basin seating rim 74 and thus allow the user to select the air flow rates desired. The four, soil or media filled wicks/legs 258 drop from the gardener 462 into the water in the basin 10. Capillary action draws the water up and the plants osmotic action accelerates and regulates the water flow.

The user, after connecting a water delivery line 56 to the basin 10 will not have to water the plant again unless his water supply is stopped. With the use of existing standard in-line fertilizing devices and using water soluble nutrients, the user can also automatically fertilize the plant.

The gardener 462 can be made in a virtually unlimited number of shapes and sizes including but not limited to: square, rectangular, elbow shaped, ½ doughnut shaped, square gardeners 484 that fit round basins 10 and gardeners with various height walls for use as terraiums, spice gardens and the like. The gardener 462 and basin 10 can be placed on surfaces, attached to surfaces or hung using an optional handle or hangers that slip into two of the four hanger keys 470 provided along the top rim 468 of the gardener 462. For ground based usage the gardener 462 rotates 360 degrees by lightly depressing the latches 162 and rotating. Vent slots 476 through the horizontal surfaces of the bottom of the gardener 462 allow air movement through the basin 10 and up through the gardener 462. The user may adjust the amount of air flow by rotating the gardener 462 to allow the desired vent gap.

The gardener 462 can be divided into 2, 3 or 4 sections using the reversible interlocking divider panels 480 that come in a half panel 477 or quarter panel 479 configurations and snap into the gardener divider slots 560 on the gardener floor 481 and the ARP divider locking slot 472 on the gardener rim 468 and rest in the ARP divider rail 506 and hook on to the divider catch 556. The quarter panels 479 have a reversible center catch to allow the quarter panel to be placed on the opposite side of the half panel 477. The ARP air slots 512 perform the pruning and ventilation functions by steering roots into the ARP where they will air prune or enable manual cutting of the roots determined by the root characteristics of the plant/s being grown. The ARP base 516 seals the area above the gardener floor while the ARP punch base 518 is tapered and sharp enough and strengthened by the base 516 sufficiently to punch through the ARP insertion knockouts on the gardener floor 481. The dividers 475, 477 and 479 completely separate the gardener 462 into discrete sections so that different plants with different requirements and media can all self water and fertilize at their respective rates in different compartments of the same container. Plants can be started as seeds or seedlings and when their growth exceeds the size of their container they can be easily moved and transplanted.

The gardener 462 can be turned into an air root pruning (ARP) container by using up to five aerating root pruners 482. The since abandoned Air Root Pruning Container U.S. Pat. No. 4,510,712 is incorporated by reference in its entirety into this disclosure. The aerating root pruners 482 are interchangeable and reversible vented tubes that snap into the ARP insertion knockouts 478 on the gardener floor 481. The ARP's 482 seat into the gardener rim 468 using seating tabs on their top out facing edge immediately opposite the ARP divider rail 506 on the ARP head 500 through which passes the ARP top opening 504 through which passes air from the basin 10. When used in the preferred embodiment of the attachment there are 24 ARP directional surfaces available to the plant roots which far exceeds the original ARP U.S. Pat. (4,510,712) of 8 ARP directional surfaces. Also the ARPs 482 function as an excellent aeration means for the gardener 462. The ARPs 482 and the dividers 475, 477 and 479 can be used in any combination desired. As roots grow into the ARP over time the user may wish to clean them out and may do so with the manual ARP cutter tool 526. The user grasps the tool by the cutter handle 528 and then positions the cutter 526 over the ARP 482 and pushes the cutter down and into the pruner thereby cutting the roots. Upon being pulled out of the ARPs 482 the elliptical holes through the wall of the cutter 526 help grasp the cut roots and lift them out.

The gardener 462 can be made of clear plastic and covered with an opaque sleeve or decorative covers of wood or faux rock. The user can determine the extent of root binding and growth and thereby optimize transplant timing and subsequently plant growth. Also various additional accessories such as evaporation covers, decorative exterior covers, protective trays, detachable lighting, trellises and various hangers fit the gardener 462.

By mounting an optional heater in the basin 10 and connecting the ARP 482 equipped gardener 462, the user can create a frost resistant growing container. When used with the ARP's 482 the gardener 462 is able to 'smoke stack' warm air above the heated water in the basin 10 and up through the ARPs and up through and around the plant foliage above. By slightly turning the gardener 462 the user can adjust the vents 70 to create the desired venturi effect and modify the airflow based on the depth of freeze anticipated. Of course, if it gets too cold the user can always pick the gardener 462 up without or without the basin 10 and move it to shelter.

Bury Bucket Accessory

The gardener/basin 462 can also be combined with the bury bucket 566 to produce a unique ground level, self-maintaining planter. The user buries the bury bucket 566 to its rim, inserts pins into the retention pin holes if desired, hangs the matching gardener/basin 462/10 into it and connects it to drip line 56 through the ports provided. The drip line 56 is run up the inner wall of the bury bucket 566 in the hose channels 568. The floor of the bury bucket 566 is perforated 569 to allow rain water to flow through the gardener 462 and basin 10 assembly and percolate through the floor of the bury bucket. For desert environments the bury bucket allows absolute water control and conservation for plants. In cold climates it allows for the quick removal of plants and their subsequent return. For commercial purposes it would allow replacement of overgrown or deprived plants rather than replanting. The bury bucket 566 would be particularly useful in malls and other large buildings requiring intensive plant maintenance in light deprived environments. Both the gardener 462 and the bury bucket 566 stack and nest at less than 10% of their height which allows enhanced storage and shipping.

Underground Spring Attachment

The underground spring attachment 254 for the basin 10 creates an implantable subterranean water source for plants and is particularly suited for large planters and also placement in the earth under valuable ornamental and fruit trees etc. The basin 10 is first slightly modified by adding the air vent adapter 33 to the air vent 32 located on the underside of the utility bracket 12. The air vent adapter 33 provides a port for ambient air to and from the valve 14. The user places the underground spring attachment 254 onto the basin 10 by matching the underground spring seating rim 256 and the basin seating rim 74 and rotating the attachment until the two opposing underground spring latches 154 engage the basin vent/latch ports 70. The underground spring air line 262 is then connected to the external snorkel and cap 264 and the fluid delivery line 56 is connected to the basin pressurized water inlet port 18 and both air and water lines run up and out of either the hole dug in the ground or the walls of the planter where the spring 254 is located. The air line 262 is then connected to the external snorkel 264 and fastened using the snorkel support stake 266 and either stuck in the edge of the planter or in the ground near the plant once it has been planted on top of the underground spring. The user may also option to attach the external snorkel 264 to the plant itself especially if it is a tree as this will prevent possible damage to a ground based snorkel. When the assembly of the underground spring 254 is complete the user fills the dirt or media wicks 258 with dirt or other desired media and places the spring in the bottom of the hole. Soil is then distributed around and on top of the spring to the desired depth at which point the plant can be put in place and planting finished. The wicks 258 will move water upward into the plant root ball, which in turn will grow down into the underground spring wicks 258 and vent slots 260. After a few years when the tree roots have overwhelmed the spring 254 it can be shut down and the air and water lines cut off. The underground spring 254 could significantly enhance the survivability of valuable ornamental and fruit trees and would theoretically increase vegetative growth rates and fruit yields especially if fertilizing and therapeutic agents are fed into the underground spring in the water stream. Many different sizes and styles of underground spring 254 could be made to meet different requirements with one example being a elongated rectangular underground spring which could provide automatic watering for large strip planters in malls, restaurants and other large facilities.

Garden Pot Converter Attachment

The pot converter attachment 166 for the basin 10 allows the user to take an ordinary plant pot of almost any style or type (bottom or side drainage) and convert it into a true self watering pot, or if they wish use the basin 10 and converter 166 as a traditional water reservoir for the pot that the user would refill manually by simply pouring water onto the converter or through one of the converter wick holes 174. The user places the converter 166 onto the basin 10 by matching the pot converter seating rim 168 and the basin seating rim 74. The user then inserts ordinary rope wicks or quick wicks (disclosed in the present inventor's Provisional Application Serial No. 60/105,038, which disclosure is incorporated herein by reference), into the drainage holes of their existing pot. The pot converter wick holes 174 on the top surface of the converter 166 allow the wick/s to pass through and into the water within the basin 10. Capillary wicking and the plants natural osmotic forces will draw water from the basin 10 which refills automatically when used with the fill valve 14. The user can lift the pot by gripping the converter 166 with both hands and removing it from the basin 10. The converter legs 173 act as a stable set of feet for the converter attachment 166 when it is removed from the basin 10, thereby preventing damage to the dangling wicks. The converter 166 will accept any size pot up to its maximum diameter defined by the pot converter upper rim 172. The converter attachment 166 can be made to fit any size or style basin 10, (examples are a square converter and the rectangular converter. On the topside of the converter 166 are drainage elevation ribs 176, that strengthen the converter unit and separate the ordinary plant pot from the converters 166 horizontal surface and enhance ventilation and prevent water from collecting under the pot. The pot converter 166 is particularly suited for converting existing ordinary pots with plants in them into automatic pots instantly when used with either of the three styles of quick wick.

Multipurpose Planter/Basin Combination

The Multipurpose Planter/Basin Combination 700 provides three different uses from the same device. By combining the complete basin 10 structure with the gardener 462 and eliminating the vent/latch ports 70 normally present in the basin, a watertight wall is provided that allows the multipurpose planter to fill with water up to the rim of the unit. This allows the multipurpose planter to function as a cut flower holder and display unit for use in flower shops and other stores selling cut flowers. Seating the removable tray 702 within the planter 700 provides a perforated tray that holds the flowers above the fill valve 14. The user first adjusts the fill level of the valve 14 to the desired water height, which for cut flowers will be usually over half the capacity of the complete unit, and then places the removable tray 702 inside and if desired the optional dividers 477 and 479 can be inserted into the removable tray divider slots. For display purposes the multipurpose planter 700 can be connected in series allowing all of the planters to be drained and refilled in unison and automatically if a timer unit is used for the drain function.

The multipurpose planter 700 can also be implanted in the ground in a manner similar to the bury bucket 566 but does not provide the removable characteristics offered by the separate bury bucket and gardener 462 combination.

By modifying the removable tray 702 to accept aerating root pruners 482 and adding wick/legs 463 to the tray, the planter 700 can be used as a gardener, but does not allow the user to access the basin portion of the unit when it is full of soil without removing the plant and the soil within the unit.

Animal Waterer Attachment

The animal waterer attachment 222 for the basin 10 creates a water dish for automatic watering of virtually any animal. The user places the waterer 222 onto the basin 10 by matching the waterer seating rim 224 and the basin seating rim 74 and rotating the attachment until the two opposing waterer latches 152 engage the basin vent/latch ports 70. The waterer attachment 222 snaps on to and off the basin 10 without the use of tools. The basin 10 itself can be mounted or screwed to surfaces which can prevent most animals from moving the waterer 222 when it is connected and latched to the basin. The waterer 222 is shaped to nest within the basin 10 and has an integrally molded valve cover 228 to protect the valve 14. The waterer 222 has water slots 232 through the horizontal surfaces of the attachment allow for water circulation. The entire interior surface is smooth so as to be 'tongue safe', and also be easily cleaned. The basin drain line 60 can also be attached and regulated with an in-line micro-drain regulating valve to drip water to another site (e.g. a planter or tree) thus allowing the user regulated, constant replacement of the water in the waterer. When the waterer 222 is supplied by typical municipal chlorinated water, the waterer could, in its optimum configuration (with regulated drain), function perpetually with little or no maintenance. Water consumption rates, location and other variables have an affect on the maintenance requirements, however the unit would able to be left for extended periods of time without attention.

Portable Valve Base

The fill valve 14 fits and functions as described above on the portable valve base 676 which when combined with the fill valve and connected by the snorkel air line 262 and the liquid delivery line 56, becomes a true portable valve 680 capable of filling and regulating volumes of liquid in many different types of vessels including but not limited to: livestock and animal watering troughs, fountains, water storage tanks, ponds, swimming and kiddie pools and aquariums. The option of replacing the adjusting screw spring of the fill valve 14 with a spring of greater resistance allows the fill valve 14 to function in vessels of larger liquid capacity. The portable valve base 676 is in concept and design similar to the basin described in the parent application in that it is absent only the side walls and air vent of the basin, which functions are replaced by the walls of the vessel within which the portable valve base is placed within and the use of the air vent adapter 33 and the snorkel air line 262 which extends remotely the basin air vent 32. The addition of ballast of any suitable kind within the cavity on the top side of the portable valve base 676 keeps the portable valve base stable, upright and on the bottom of any vessel within which it is placed.

The portable valve base 676 has a liquid inlet 678 and an ambient air channel 679 which create sealed and isolated air and water channels and also accepts the hose adapters 50 used for connecting pressurized and drain lines or conduits to the basin 10.

The external snorkel 264, necessary for operation of the portable valve base 676 and the valve 14 comprises; an external snorkel and cap 264 used to prevent blockage of the snorkel air line 262 by debris and a support stake 266 which when combined retains the liquid delivery line 56 and the snorkel air line 262 and can be attached to surfaces using the support stake nail/screw hole 267 or pushed into dirt or other media with the pointed end of the stake. The portable valve cage 677 is hinged to the portable valve base 676 and helps protect the reservoir valve 17 from external damage such as that caused by livestock. Particularly in the case of livestock waterers or other applications where the portable valve base 676 and the fill valve 14 are exposed to potential damage, the user can also armor the liquid delivery line 56 and snorkel air line 262 in any matter dictated by circumstances, for example; installing the lines in rigid conduit of any appropriate material or plumbing very close to the portable valve base 680 with rigid pipe connected to the portable valve base with short lengths of liquid delivery line 56.

Portable Garden Brackets

By combining multiple gardeners 462 with the portable valve assembled 680 in a substantially shallow water tight tray, a permanent reservoir can be provided that would enable many gardeners to be maintained by a single valve. The portable garden brackets 682 allow the user to create a water holding tray by quickly and easily connecting typical wood 2×4's together to create reservoirs of virtually any shape. The portable garden bracket 682 is a substantially "L" shaped structure, but in another embodiment could be made at any angle allowing the final assembly to come together creating a continuous wall. The user places precut wood or other material structural rails 689 into to the structural rail supports 683 and can optionally secure them with screws or nails using the floor screw/nail holes 684 and the wall screw/nail slots 686 in any combination and quantity that meets the strength and use requirements of the user. The portable garden brackets 682 can be used in many installations with no securing screws or nails. The typical installation would require four portable garden brackets 682 and the installation of no less than 2 sets of paired structural rails 689 to create the square or rectangle desired. When portable garden brackets 682 and structural rails 689 are assembled, a plastic or other water tight liner is laid within and over the structural rails and held in place with plastic clips similar to the typical picnic table cloth clip. The portable valve 680 is then placed within the newly created reservoir which can then accept and support as many gardener 462 units as can fit within the available space.

The portable garden brackets 682 are equipped with tube support 687 structures which can accept metal or other structural tubing which can be shaped in various forms to create shade covers and enclosing greenhouse covers when combined with shade cloths or semi-transparent or transparent covers. A support stake receptacle 688 is located on the top side of the bracket 682 which accepts the external snorkel and cap 264 used by the portable valve 680.

| List of Reference numbers |
| --- |
| 10 Basin (complete) |
| 11 Adjustable fill valve |
| 12 Utility bracket |
| 13 Utility bracket foot |
| 14 Fill valve |
| 15 Valve adjusting screw |
| 16 Basin body (without utility bracket) |
| 18 Pressurized water inlet/outlet port |
| 20 Pressurized water channel |
| 21 Energy directors |
| 22 Internal water port |
| 32 Air vent |
| 33 Air vent adapter |
| 34 Utility bracket air channel |
| 36 Internal air channel |
| 38 External drain line port |
| 50 Hose adapter |
| 51 Retaining clip slot |
| 52 Adapter cutting tip |
| 53 Retaining clip |
| 54 Adapter cap |
| 55 Adapter O-ring |
| 56 Water delivery line |
| 60 Drain line |
| 64 Basin feet |
| 68 Basin hold-down tabs |
| 70 Basin vent/latch ports |
| 72 Basin rim |
| 74 Basin seating rim |
| 76 Basin stacking support |
| 78 Water level sight glass |
| 80 Valve mounting seat |
| 82 Retention tabs |
| 88 Water gasket trough |
| 90 Air gasket trough |
| 96 Water isolating gasket |
| 98 Air isolating gasket |
| 100 Valve base |
| 108 Valve base compression cam |
| 110 Basin plug |
| 112 Basin plug finger key |
| 120 Basin drain screen |
| 121 Drain screen support |
| 123 Drain screen removal well |
| 152 Animal waterer latch |
| 154 Underground spring latch |
| 162 Gardener latch |
| 166 Pot converter attachment |
| 168 Pot converter seating rim |
| 172 Pot converter upper rim |
| 173 Pot converter legs |
| 174 Pot converter wick holes |
| 176 Pot converter drainage elevation ribs |
| 222 Animal waterer attachment |
| 224 Waterer attachment seating rim |
| 228 Waterer valve cover |
| 232 Waterer water slots |
| 234 Waterer floor |
| 254 Underground spring attachment |

-continued

| List of Reference numbers |
| --- |
| 256 Underground spring seating rim |
| 258 Soil or media wicks |
| 260 Underground spring vent slots |
| 262 Snorkel air line |
| 264 External snorkel and cap |
| 266 Snorkel support stake |
| 267 Support stake nail/screw hole |
| 462 Gardener attachment |
| 463 Gardener wick/legs |
| 464 Gardener seating rim |
| 466 Gardener bottom rim vent slots |
| 468 Gardener top rim |
| 470 Hanger keys |
| 472 ARP divider locking slot |
| 475 ARP divider |
| 476 Gardener bottom vents |
| 477 Half panel divider |
| 478 ARP insertion knockouts |
| 479 Quarter panel divider |
| 481 Gardener floor |
| 482 Aerating root pruner assembly |
| 483 Aerating root pruner part |
| 484 Square gardener |
| 498 ARP tab |
| 500 ARP head |
| 504 ARP head opening |
| 506 ARP divider rail |
| 511 Divider slot |
| 512 ARP air slots |
| 516 ARP base |
| 518 ARP punch base |
| 526 ARP cutting tool |
| 528 Cutter handle |
| 560 Gardener divider slots |
| 566 Bury bucket |
| 567 Bury bucket retention pin hole |
| 568 Hose channels |
| 569 Perforations |
| 582 Manual filler |
| 634 Valve cover |
| 640 Lever |
| 641 Pre-set cap |
| 643 Pre-set cap Spring retainer |
| 660 Valve body |
| 664 Fastening screw |
| 666 Valve outlet |
| 669 Screw receptacle base |
| 676 Portable valve base |
| 677 Portable valve cage |
| 678 Portable valve water inlet |
| 679 Portable valve air channel |
| 680 Portable valve assembled |
| 681 Portable valve ballast |
| 682 Portable garden bracket |
| 683 Structural rail support |
| 684 Floor screw/nail holes |
| 685 Portable bracket feet |
| 686 Wall screw/nail slots |
| 687 Tube support |
| 688 Support stake receptacle |
| 689 Structural rail |
| 700 Multi-purpose Planter/Basin |
| 702 Removable tray |
| 704 Removable tray divider slots |
| 706 Removable tray screen |

What is claimed is:

1. The combination of a container for growing plants having a substantially non-porous and solid side wall and bottom and at least one aerating root pruner (a) which is in the shape of an elongate tube or conduit with a plurality of perforations or openings therein which provide a high ratio of open areas to total vertical wall surface area, (b) which is positioned in or adapted to be positioned at a fixed relatively vertical position proximate to the interior surface of the side wall of the container prior to filling the container with plant growing medium, (c) whose upper end projects nearly to or above the top of the container; (d) whose lower end is positioned proximate the bottom of the container in container, in communication with the atmosphere through a port in the side wall or bottom of the container; and (e) which is removably affixed to the side wall of the container, whereby the pruner can if desired be cleaned interiorly of roots of a growing plant planted in the container which invade the interior of the pruner and can be removed prior to or concurrently with the removal of the growing plant from the container.

2. The combination of claim 1, wherein the tube or conduit is cylindrical in shape.

3. The combination of claim 1, wherein the port is in the side wall of the container, proximate the bottom of the container.

4. The combination of claim 1, which comprises a plurality of the pruners, each of which are in communication with a separate port in the container.

5. The combination of claim 1, wherein the tube or conduit is cylindrical in shape; wherein the port is in the side wall of the container, proximate the bottom of the container; and wherein the container comprises a plurality of the pruners, each of which are in communication with a separate port in the container.

6. The combination of claim 1, wherein the port is in the bottom of the container, proximate the side wall of the container.

7. The combination of claim 6, which comprises a plurality of the pruners, each of which are in communication with a separate port in the container.

8. The combination of claim 6, which comprises a plurality of the pruners, each of which are in communication with a separate port in the container and wherein the tube or conduit is cylindrical.

9. The combination of claim 1, wherein the aerating root pruner is equipped with a plurality of fins radiating therefrom, whereby growing plant roots are directed through the perforations in the wall of the tube or cylinder into the interior of the pruner.

* * * * *